US010528797B2

(12) United States Patent
Kassatly et al.

(10) Patent No.: US 10,528,797 B2
(45) Date of Patent: Jan. 7, 2020

(54) SOCIAL MEDIUM, USER INTERFACE, AND METHOD FOR PROVIDING INSTANT FEEDBACK OF REVIEWER'S REACTIONS AND EMOTIONAL RESPONSES

(71) Applicants: Danielle M Kassatly, San Jose, CA (US); Michelle M Kassatly, San Jose, CA (US); L Samuel A Kassatly, San Jose, CA (US); Gabrielle M Kassatly, San Jose, CA (US)

(72) Inventors: Danielle M Kassatly, San Jose, CA (US); Michelle M Kassatly, San Jose, CA (US); L Samuel A Kassatly, San Jose, CA (US); Gabrielle M Kassatly, San Jose, CA (US)

( * ) Notice: Subject to any disclaimer, the term of this patent is extended or adjusted under 35 U.S.C. 154(b) by 302 days.

(21) Appl. No.: 15/427,966

(22) Filed: Feb. 8, 2017

(65) Prior Publication Data
US 2018/0225014 A1    Aug. 9, 2018

(51) Int. Cl.
| | | |
|---|---|---|
| *G06F 3/0482* | (2013.01) | |
| *G06K 9/00* | (2006.01) | |
| *H04L 12/58* | (2006.01) | |
| *G06F 21/60* | (2013.01) | |
| *G06F 16/903* | (2019.01) | |

(52) U.S. Cl.
CPC ... *G06K 9/00255* (2013.01); *G06F 16/90335* (2019.01); *G06F 21/606* (2013.01); *H04L 51/22* (2013.01)

(58) Field of Classification Search
CPC .... G06F 17/30; G06F 3/0482; G06F 3/04886; G06F 16/90335
See application file for complete search history.

(56) References Cited

U.S. PATENT DOCUMENTS

| | | | | |
|---|---|---|---|---|
| 2013/0339433 | A1* | 12/2013 | Li | G06K 9/00 709/204 |
| 2016/0062560 | A1* | 3/2016 | Le | G06F 16/21 715/810 |
| 2017/0046024 | A1* | 2/2017 | Dascola | H04M 1/72522 |

* cited by examiner

*Primary Examiner* — Andrea C Leggett
(74) *Attorney, Agent, or Firm* — Danielle Kassatly; Samuel Kassatly

(57) ABSTRACT

A user interface for use in a user station to communicate with other user stations by means of a single uninterrupted, continuous, swiping motion while in continuous contact with the user interface, includes a contacts selection module that enables a user to select desired recipient contacts. A response selection module, R, authorizes the acquisition of the user's reaction. A reaction module captured the user's authorized reaction. A message selection module, M, enables the selection of the user's message. A query selection module, Q, enables the selection of the user's query to be selectively transmitted to said other user stations. An object transmission module selectively transmits the user's authorized reaction, the user's optional message, and the user's query to the other user stations.

19 Claims, 19 Drawing Sheets

SOCIAL MEDIUM, USER INTERFACE, AND METHOD FOR PROVIDING INSTANT FEEDBACK OF REVIEWER'S REACTIONS AND EMOTIONAL RESPONSES

FIELD OF THE INVENTION

The present invention relates in general to the field of social media communications, and in particular to a system, social medium, user interface, and associated method for providing instant feedback of reviewer's reactions and emotional responses.

BACKGROUND OF THE INVENTION

The field of social media has pervaded our lives in an unprecedented way. It enables us to communicate instantly for various purposes, such as to execute a business transaction or simply to chat. A sender can, for example, transmit a text message and expect an almost instantaneous text message response back from the receiver.

Such communication is an example of what is termed herein as "blind communication" because it does not allow one or more parties to such communication to actually view and experience the physical reactions of the other party while responding to a blind communication.

In the foregoing example, the sender of the text message is unable to view the receiver's reaction to the sender's text message. This constitutes a shortcoming in the field of communication, in that communication relies heavily on verbal and non-verbal cues, such as physical reactions, body language, and emotions.

As a result, emojis have been introduced for the parties to express their sensations, feelings, and reactions. However, no matter how communicative and entertaining these emojis are, they remain deficient in that they do not necessarily reflect the communicating party's true emotions.

SUMMARY OF THE INVENTION

The present disclosure addresses the above-identified concerns, and presents a novel system, device, processor implemented utility, social medium, user interface, a computer-implemented method of operation, workflow, and application residing on a non-transitory computer-readable medium (also collectively referred to herein as "user station"), for providing instant and automatic feedback of reviewer's verbal and non-verbal cues, such as reactions and emotional responses.

According to another embodiment of the present invention, data is inputted via a gridded user interface that enables a user to effect complete operations (or functions) with a single digit (or instrument, such as a pen) by continuously swiping the digit across the touchscreen, without interrupting the swipe and without removing the digit from the touchscreen.

To this end, the present invention describes a user interface for use in a user station to communicate with other user stations by means of a single uninterrupted, continuous, swiping motion while in continuous contact with the user interface, includes a contacts selection module that enables a user to select desired recipient contacts. In another embodiment, the swiping motion does not need to be continuous or single or uninterrupted. A response selection module, R, authorizes the acquisition of the user's reaction. A reaction module captured the user's authorized reaction. A message selection module, M, enables the selection of the user's message. A query selection module, Q, enables the selection of the user's query to be selectively transmitted to said other user stations. An object transmission module selectively transmits the user's authorized reaction, the user's optional message, and the user's query to the other user stations.

It should be understood that the user is able to send a message to himself/herself; to edit his/her reaction; to delete his/her reaction; to mark his/her and the received messages and reactions as read or unread; to use emojis, gifs, or videos as a reaction. In other terms, the user's reaction is not limited to the user's actual reaction but it can be a selected video, memory, photo, or any other object or file from a database on or associated with the user station. In one embodiment, the video length may be either set by the recipient user, by the sender user, by the recipient's user station, or manually.

The user interface includes an executable grid that defines the contact selection module, the response selection module, the message selection module, and the query selection module. In one embodiment, the executable grid is defined by at least one executable outline (or line). According to another embodiment, the at least one executable outline defines at least two executable quadrants.

In addition, the present invention is not limited to communications with other user stations, but could alternatively be used on the user's own station. As an example, while the user is running an application on the user station, the user's real time reactions are monitored by the user station or another device, so that the user's real time reactions can trigger a response, a reaction, or an application on the user's station. For illustration purpose, as the user is playing a video game, a look of fear, anticipation, or any other expression, as determined by facial recognition i.e., widened pupils, sweating, heart racing, heart beat, heat emitted from the hand, eye movement, movement of the body, breathing rate causes the video game to interact and respond in a certain way. In addition, the camera (or other devices) of the user station may also collect data such as environmental data, lighting, temperature, pressure, location, etc. For learning videos, if the student becomes stressed, the program could "go easier" on the student. For action video games, if the player is scared, the application reduces the amount of violence in the video games. Alternatively, if the player or student appears to become bored, the application increases the learning pace, or the amount of action, lights, and flashing excitement triggers in the video games. This would allow the present invention to be used as part of numerous devices, including but not limited to a video game console, an application on a smart phone, etc.

An additional feature of the present invention is that it enables the narrowing of the search result. As an example, if a user station receives several messages in addition to the messages saved on his/her user station, the user might need to conduct a search for the most appropriate messages to forward to other users or to view. In this case, the user station provides a random search function that can be narrowed down by successive steps. As an example, the user can enter or select the desired search terms, and then select a random search button on the user interface to conduct the first random search. This first random search will use the search terms and in addition, use a Gaussian spatial distribution to select nearby results. A second random search may be similarly conducted on the first random search result in order to further narrow down the search result. Similar successive random searched may be conducted until the desired convergence limits or parameters are attained, at which time, the final search result is attained. This search method may be used in games or applications that used random selection, such as lottery, dating applications, social networking, etc.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

It should be understood that the sizes of the chart and the different components in the figures might not be in exact proportion, and are shown for visual clarity and for the purpose of explanation.

DETAILED DESCRIPTION OF PREFERRED EMBODIMENTS

Figure 1:
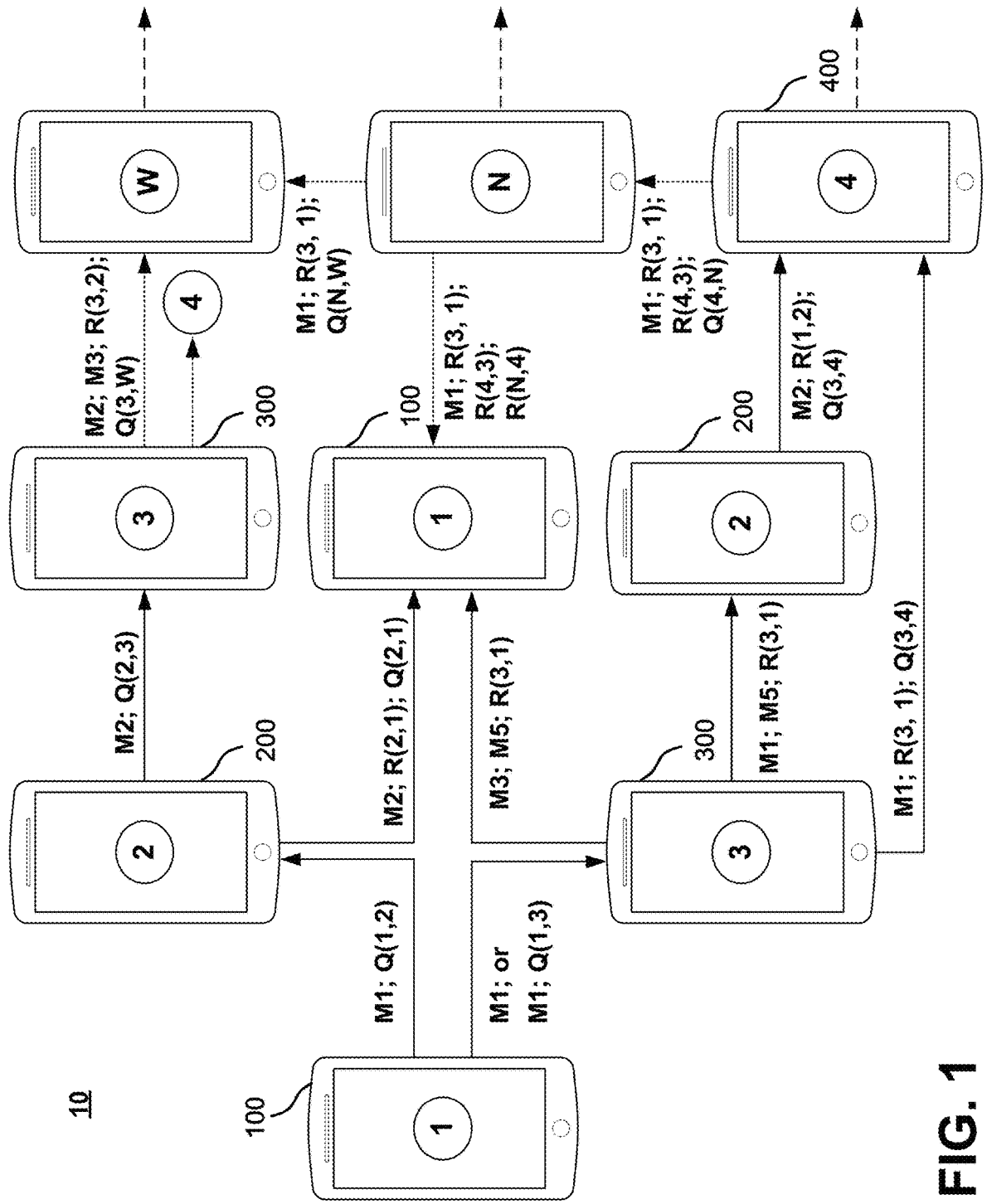
FIG. 1 depicts an overall view of an exemplary social network setting in which the present invention operates according to one embodiment.

FIG. 1 depicts an overall view of an exemplary social network setting 10 in which the present invention operates according to one embodiment. The exemplary setting 10 illustrates a plurality of user stations 1, 2, 3, 4, . . . , N, . . . , W that communicate whether remotely over a network such as the Internet, or via direct communication. Although the user stations 1, 2, 3, 4, . . . , N, . . . , W can be functionally similar or identical, their functions be different, such as for instance, one user station can include a smart phone, while another user station can include a server or another communication device.

In the illustrated scenario, a user 1 (also referred to herein as user station 1 and referenced by the numeral 100) concurrently sends a message M1 along with a query Q(1, 2) to user station 2 (also referenced by the numeral 200), along with the same message M1 (or alternatively a different message) to user station 3 (also referenced by the numeral 300).

The message M1 can be include any type of data, whether video, still or moving (live) photos, screen shots, a written message, an audio file, an emoji, or any other suitable content. As used herein, the term "query" refers to a request from the message sender (e.g., user station 1) to the message receiver (e.g., user station 2), in which the sender requests authorization from the receiver to have his/her/its reaction to the message be taken or recorded. In other terms, Q(1,2) refers to a request from user station 1 to user station 2, asking for user station 2's authorization to have user station 2 capture user 2's reaction to user 1's message 1 (M1). It being noted that the authorization can be given manually by an actual user, or automatically via the user stations, by pre-setting the user stations.

If the receiver user's authorization is granted, then user station 2 will automatically capture user 2's reaction to message M1, by means of a reaction capturing module 910, such as for example, a built-in camera, to replace or complement the conventional emojis. As an example, the reaction can reflect the following nonverbal cues including actual real time "emotions" "sad," "happy," "bored," "scared," "worried," "disgust," "trust," "anger," "depression," "admiration," "acceptance," "anticipation," "expectation," "annoyance," "surprise," "shame," "confidence," "courage," "fear," "worry," "calm," "enmity," "cruelty," "pity," "indignation," "envy," "love," etc. In addition, the reaction to message M1 can include or be accompanied by a physical gesture by the recipient user.

Returning back to the scenario of FIG. 1, user 1 is interested in user 2's reaction but not the reaction of user 3 and so does not send query Q(1,3) to user 3. Alternatively, user 2 may be interested in user's 3 reaction and send Q(1,3) to user 3. In response to message M1 and the accompanying query Q(1,2) or lack thereof, user 2 resorts for example, to user interface 510 of FIG. 5 (as it will be explained later in more detail), to send message M2 accompanied by query Q(2,3) to user 3, requesting user 3's authorization to capture user 3's reaction to message M2 (or to the communication thread). In addition, user 2 responds to user 1 by sending a response message M2, the captured reaction R(2,1) of user 2 to message M1, along with user 2-initiated query Q(2,1) to capture user 1's reaction to message M2 and query Q(2,1).

In turn, user 3 responds by sending message M3 to user 1 along with user 3's reaction to message M1, even though user 1 may not have requested user 3's reaction. In addition, user 3 forwards message M1 to user 2, along with the captured reaction R(3,1). User 3 further expands the original communication circle comprised of users 1, 2, 3, and adds user 4 to the network by forwarding message M1, capture reaction R(3,1), as well as user 3's own query Q(3,4), to user 4 (or user station 4, also referenced by the numeral 400), requesting user 4's reaction to message M1, and captured reaction R(3,1). The communication network can similarly be expanded to numerous (or unlimited number of) users, N, or groups of users, W.

While the queries are shown to be requested with each communication, it should be understood that a pre-acceptance to accept or reject the queries from specific users or groups of users can be pre-selected in the settings of the user interface, e.g., 505. The captured responses, R(x,y), can be acquired automatically by the camera of the recipient's user station or it can be taken by, and then imported from an external camera.

Figure 2:
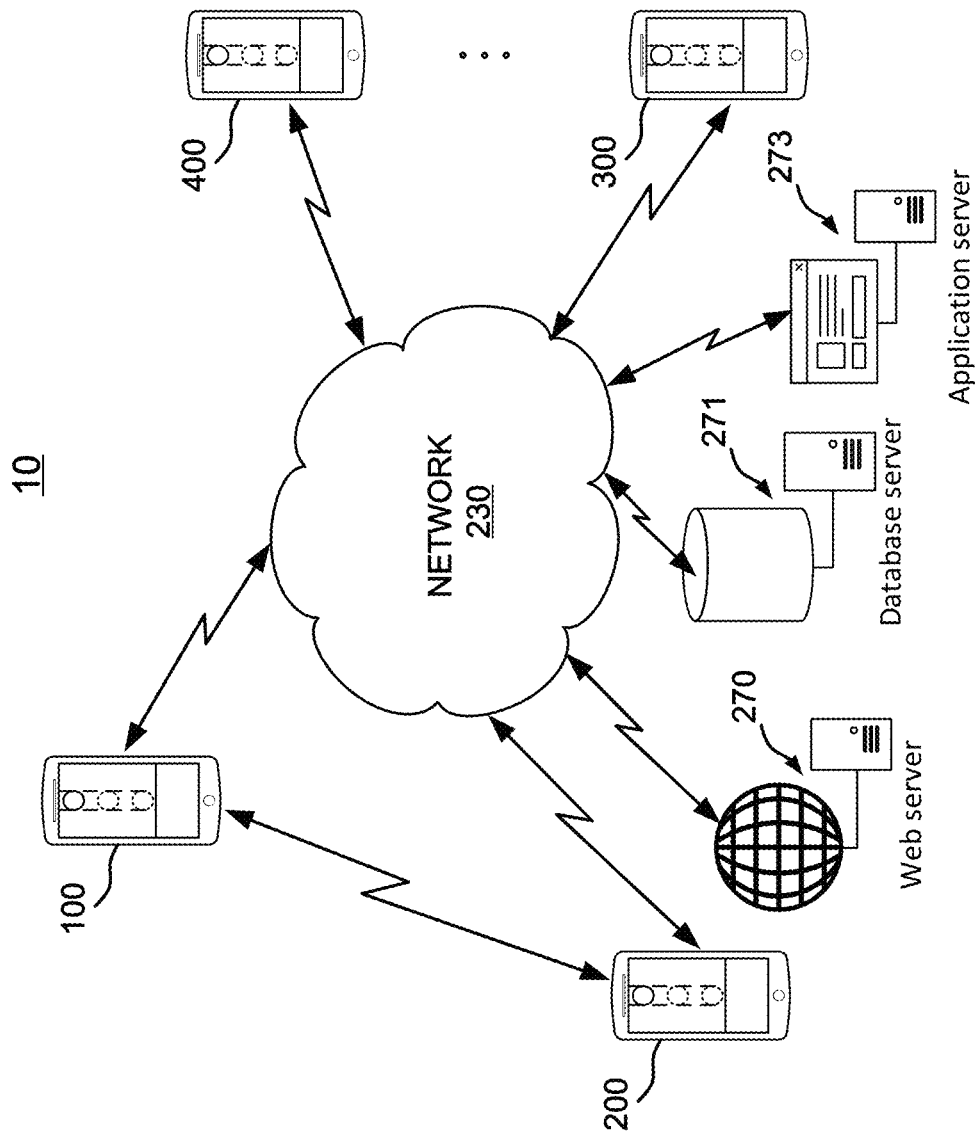
FIG. 2 illustrates a high-level view of the social network setting of FIG. 1, in which a plurality of user stations communicate with each other and various servers, either remotely over a network, such as the Internet, or via direct communication.

FIG. 2 illustrates a high-level view of the social network setting 10 of FIG. 1, in which the plurality of user stations 100, 200, 300, 400, communicate with each other and various servers 270, 271, 273, either remotely over a network 230, such as the Internet, or via direct communication.

Figure 3:
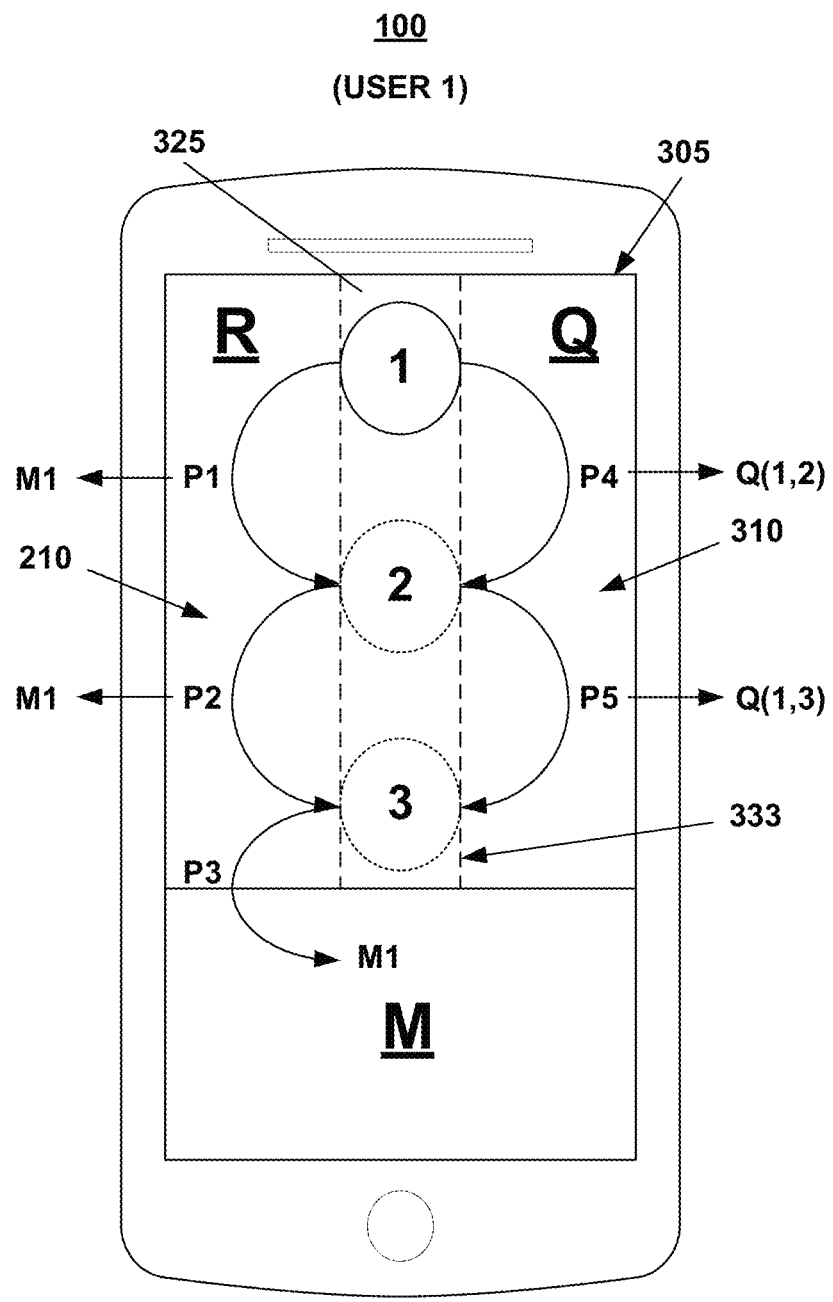
FIG. 3 depicts a view of an exemplary user station (or computing device) of FIG. 2 that includes a touchscreen, and that illustrates a gridded user interface which enables the user station to communicate with other user stations according to one embodiment of the present disclosure, using a single digit (or instrument, such as a pen or a stylus) data entry by continuously swiping the digit across the touchscreen, without interrupting the swipe and without removing the digit from the touchscreen.

Referring now to FIG. 3, it depicts a view of an exemplary user station 1 (or computing device) 100 that includes a touchscreen 305 which illustrates a gridded user interface 310 that enables the user station 100 to communicate with other user stations (FIGS. 1 and 2), according to an exemplary embodiment of the present disclosure. The gridded user interface 310 includes a grid 333 that divides the touchscreen 305 into four cells (also referred to herein as "fields"): a contact cell 325, an R cell, a Q cell, and an M cell. As used herein a "cell" can mean a "module" and can be implemented as hardware modules, or as software modules that encompass a software, instruction codes, hardware module, or a combination thereof, which provides the respective functionality, and which can be stored in memory 905 (or in another memory that may be accessible by the processor 901) of FIG. 9.

It should be understood that the grid 333 is not limited to a tabular form that includes straight cell dividing lines; rather, the grid 333 could alternatively be hand-drawn by the user to better suit the application for which it is designed. In addition, since each cell of the executable grid 333 can be a module, the grid 333 can be construed modularly, that is the number of cells can be increased or decreased by the user.

In this exemplary embodiment, the contact cell 325 includes the contact addresses (e.g., email addresses, group addresses, or message addresses, etc.) of the user station 100, and the other user stations (or users) that the user station 100 wishes to communicate with. In this simplified example, contact 1 refers to the user station 100 or user 1, while contacts 2 and 3 refer to user stations (or users) 2 and 3 respectively (FIGS. 1 and 2). The R cell is also referred to as the response cell, and allows user 1 to select the contacts to whom he/she wishes to address a message; e.g., message M1.

The Q cell is also referred to as the query cell, and allows user 1 to select the contacts to whom he/she sends a query; e.g., Q(1,2), in order to elicit a response; e.g., response R(2,1). The M cell is also referred to as the message cell, and allows user 1 to draft a message; e.g., message M1, to the selected contacts.

Figure 8A:
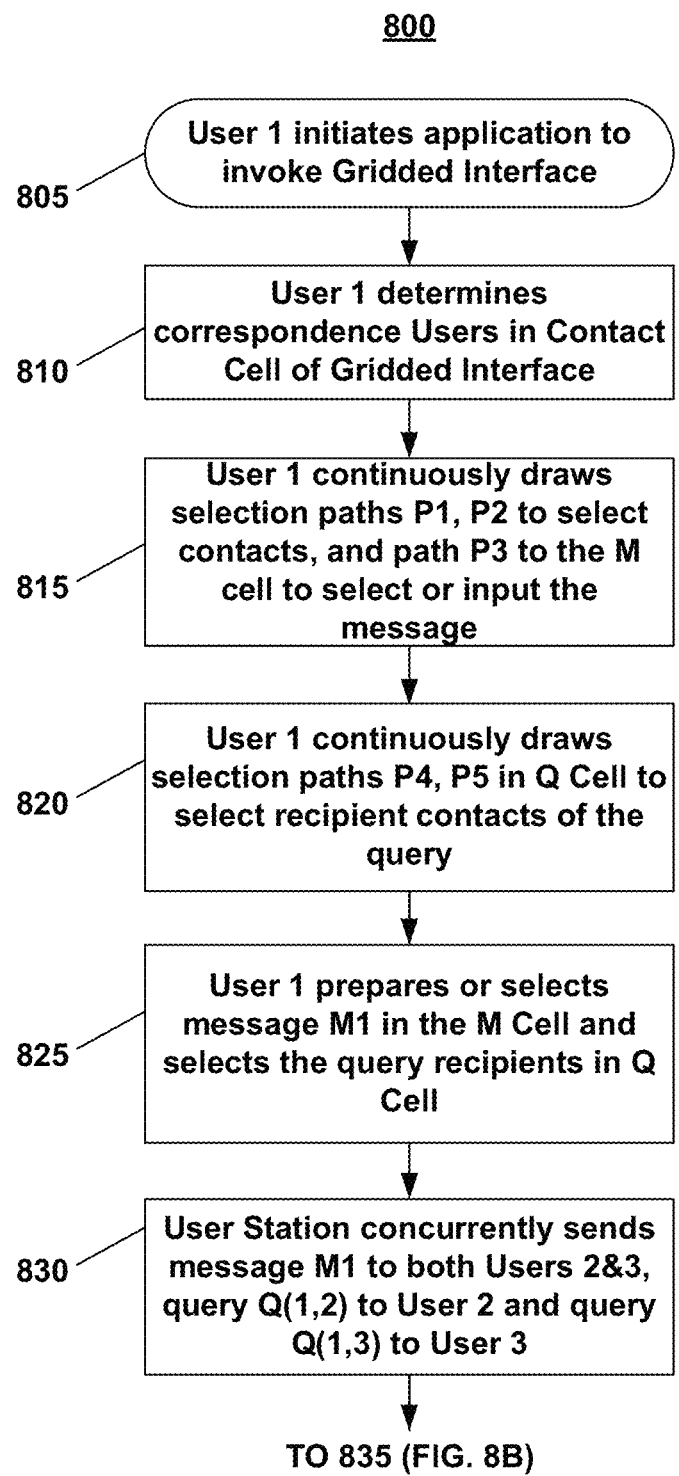
FIG. 8 is comprised of FIGS. 8A and 8B, and depicts a flow chart illustrating an exemplary operation of the user stations of FIG. 1, according to one embodiment of the present disclosure.
Figure 8B:
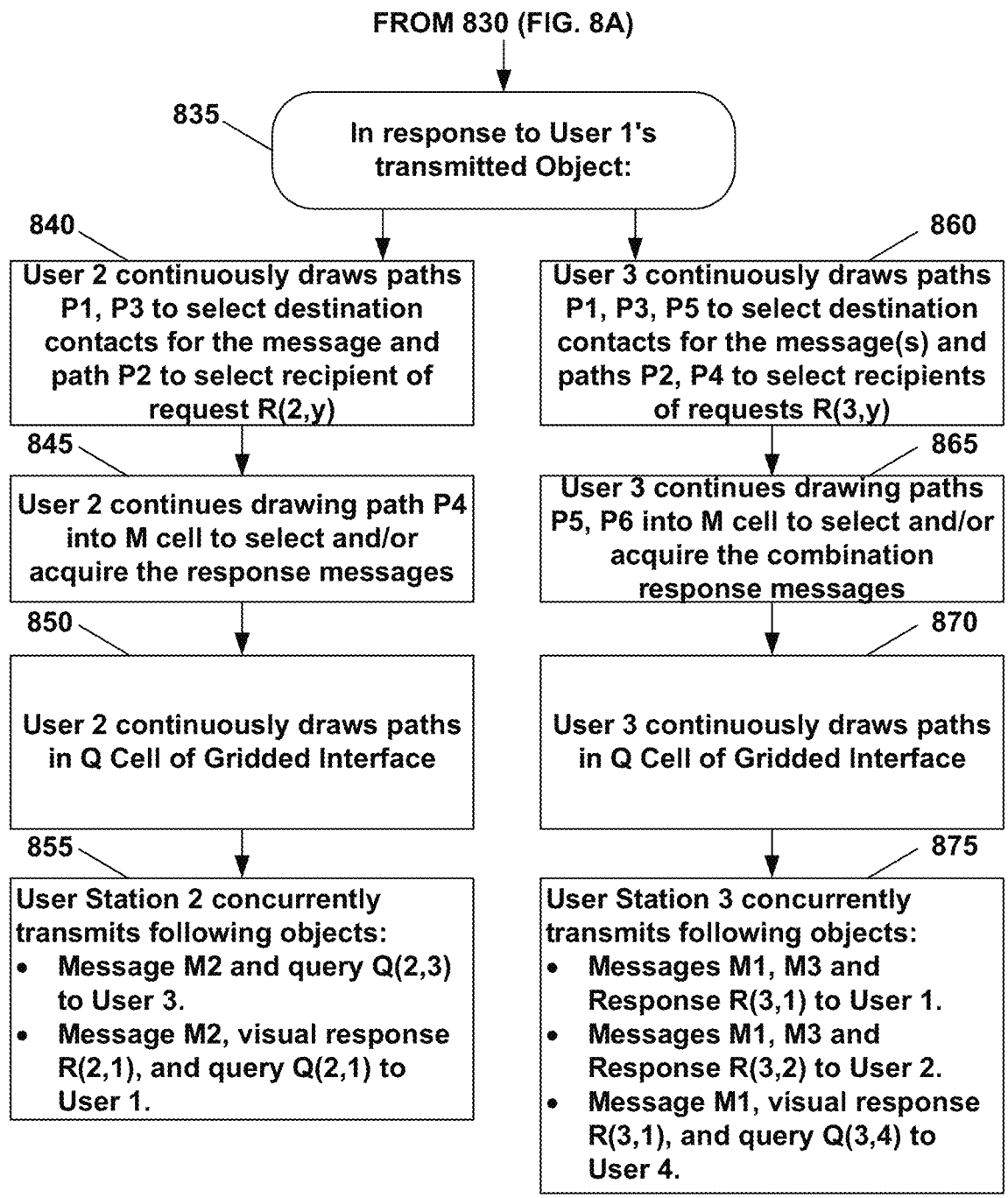

With further reference to FIG. 8 (FIGS. 8A, 8B), it depicts a flow chart of an exemplary operation (or method of use) 800 of the user stations of FIG. 1, according to one embodiment of the present disclosure. In operation, user 1 initiates an application, at step 805, in order to invoke the gridded user interface 310. The application can be downloaded online or independently purchased and installed.

At step 810, user 1 identifies the contacts he/she wishes to correspond with, as shown in FIG. 3. In this scenario, user 1 wishes to send message M1 to users 2 and 3. In order to effect this selection, user 1 draws a first path P1 that connects users 1 and 2. Path P1 instructs the user station 100 that user 1 wishes to send message M1 to user 2 (or contact 2).

However, user 1 also wishes to send the same message M1 to user 3. To this end, user 1 continues drawing another path P2, in succession of path P1, without interruption. Path P2 connects users 2 and 3 and instructs the user station 100 that user 1 also wishes to send message (the same message M1) to user or contact 3. If user 1 wishes to send message M1 to other users then user continues adding the corresponding paths serially, by drawing the respective paths, preferably continuously and without removing the pointing device or digit off the user interface 310.

Figure 4:
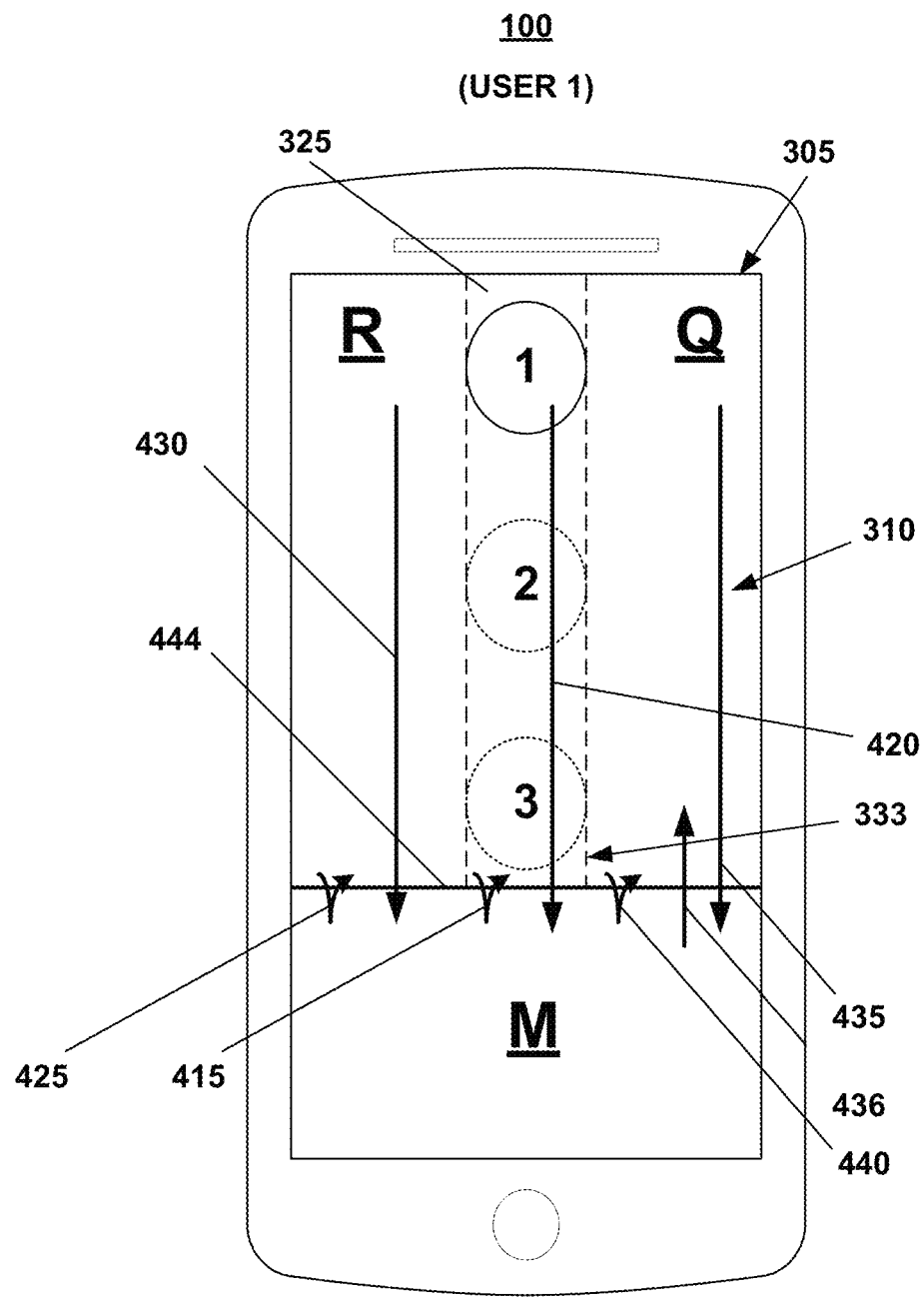
FIGS. 4, 5, 6, 7 depict additional exemplary user stations of FIG. 2, illustrating the gestural use of the gridded user interface according to various embodiments of the present disclosure.

According to another embodiment, user 1 wishes to select more contacts than would fit within the contacts cell 325 of FIG. 4. So, user 1 will need to instruct the user interface 310 to enlarge or expand the contacts cell 325 (or shown another broader cell), so that more contacts are shown and available for selection. To this end, the user interface 310 uses an executable grid 333 in that at least some of (or all) the lines or features (e.g., executable line 444) that define (or are included within) the grid 333 (and the cells formed thereby) contain executable functions, and are referred to as executable lines (also referred to as executable graphics, features, areas, or fields).

In other terms, as the user's pointing device or digit (finger) crosses one of the executable lines, a corresponding function is executed. In one embodiment, at least some (or all) the executable lines cause the same executable function to be executed. In another embodiment, each executable line relates to a distinct and different executable function.

With reference to FIG. 4, the user interface 310 can cause the contacts cell 325 to be expanded by having user 1 draw or form a directional line 420 that originates in the contacts cell 325 and that crosses the executable line 444 (in this illustrative example, toward the M cell). The crossing of the directional line 420 over the executable line 444, causes an executable or programmable function to be executed.

Figure 5:
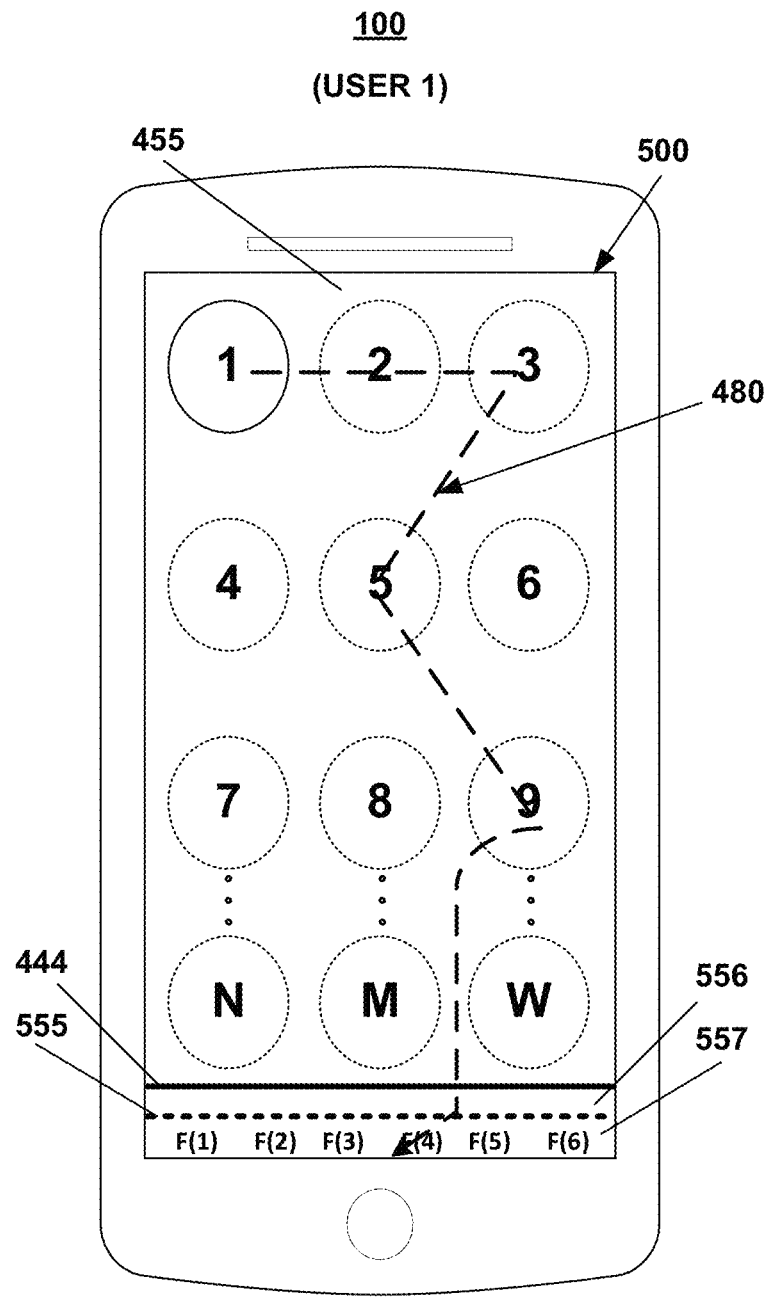

With further reference to FIG. 5, as it relates to the present scenario, the executable function causes the user interface to open another screen 500, that lists or shows an expanded list of contacts, or users, e.g., 1 through 9, N, M, W. As an example, user 1 wishes to communicate with users 2, 3, 5, and 9. To select these users, user 1 draws a continuous line (graph or graphic) 480 that connects these users. Line 480 continues past, and crosses the executable line 444, thus instructing the user interface to revert back to the original (or previous) user interface 310 screen (FIG. 4).

With reference to FIG. 5, an alternative embodiment would be to have another (or an additional) executable line 555 so that as the line 480 crosses the executable line 555, another different function is executed. In this example, the executable lines 444 and 555 create two executable fields 556 and 557, so that when line 480 enters (crosses or lands on) one of these two fields, 556, 557, a pre-selected (or pre-programmed) function is executed. In addition, FIG. 5 illustrates that field 557 contains several functions: F(1), F(2), F(3), F(4), F(5), F(6), so that when line 480 lands or terminates on any one of these functions (e.g., F(4)), then this specific function is executed. Variations of this concept are anticipated by the present disclosure. In another embodiment, the executable lines, e.g., 444, 555 are programmable.

Referring now to FIG. 4, instead of the user drawing line 420, user 1 has the option to draw a (wiggled or straight) short line 415 within the contacts cell 325, that crosses the executable line 444, to either generate the same result as described earlier in connection with FIG. 5, or to cause another function to be executed.

Similarly, if user 1 wishes to execute a function that relates to the other fields, R, Q, M, then user 1 can draw directional lines, e.g., 430, 435, 436, respectively, or wiggled lines 425, 440, that cross the executable line (or outline) 444.

According to yet another embodiment of the present disclosure, the different directions of crossing the same executable line cause different equations or functions to be executed. This feature is referred to herein as "directionality of the function execution," and is illustrated in FIGS. 6 and 7.

Figure 6:
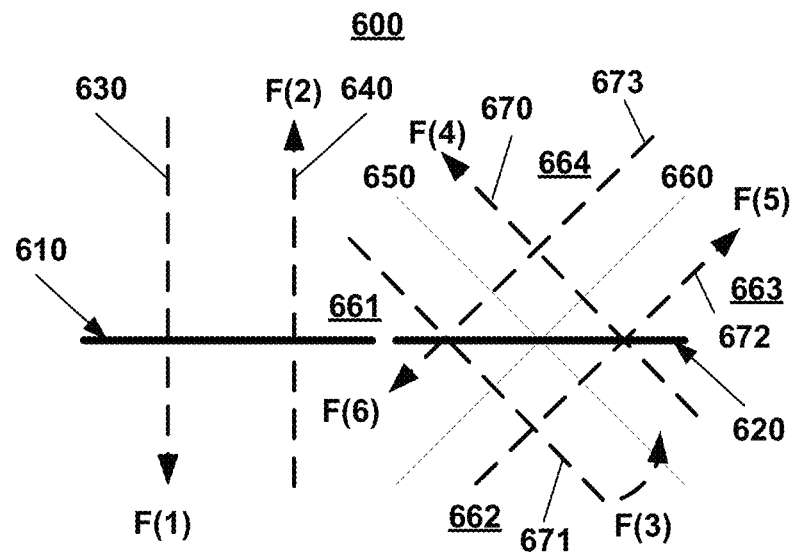
Figure 7:
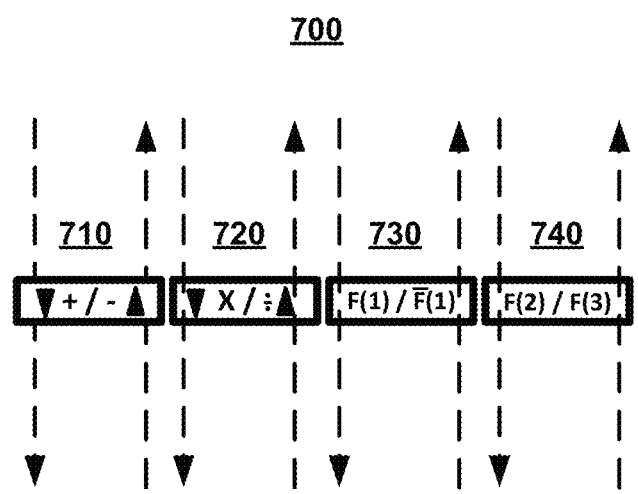

FIG. 6 illustrates an executable line (or outline) 600 that is programmed with a directional execution function. One feature of the executable line 600 is that it is modular in that it can be composed of more than just a single executable line. As an illustration, the executable line 600 that is shown in FIG. 6 is composed of two separate (not necessarily physically separated) executable segments (or sublines) 610, 620, that are programmed with the same, similar, or different directional functions.

Considering the executable line 610, if a path 630 crosses it in one direction, a first function F(1) is executed, while if a path 640 crosses it in the reverse direction, a second function F(2) that is different than F(1) is executed. In a simple illustration, both functions F(1) and F(2) are identical and the direction of travel (or direction of crossing) may be irrelevant. According to another embodiment, function F(2) is the inverse of function F(1), so that the sequential (or serial) execution of both functions F(1) and F(2) results in the annulment of the execution of function F(1). This is applicable in the exemplary event where the user wishes to cancel a transaction (e.g., a financial or other transaction), in order to correct an error.

The executable line (or outline) 620 illustrates a more complex implementation of the directionality of the function execution. The directionality of the function execution of the executable line 610 is shown to be in two directions, generally perpendicular to the executable line 610. However, the directionality of the function execution of the executable line 620 is shown to be in four directions, thus enabling the execution of four functions.

To this end, two perpendicular centerlines 650, 660 (shown in dashed lines) are either virtually drawn (i.e., effectively drawn but are not visible to the user) or visibly shown to the user, that separate the space around the executable line 620 into four executable quadrants 661, 662, 663, 664. It should be understood that the present invention is not limited to four quadrants, but could be divided into a different number of quadrants.

More specifically, a path 671 originates in quadrant 661 and crosses the executable line 620 to cause function F(3) to be executed. It would preferable for the path 671 to be generally parallel to the centerline 650. However, according to another embodiment, the only requirements for the execution of function F(3) is that path 671 originates in quadrant 661 and that it crosses the executable line 620, along one direction, while the exact disposition of the path 671 with respect to the executable line 620 would be irrelevant (i.e., they do not need to be parallel).

In one embodiment, the centerlines 650, 660 are not executable lines (i.e., they do not cause functions to be executed). However, in a more complex embodiment, the centerlines 650, 660 can be executable, and the crossing of a path, e.g., 671 across either one or both centerlines 650, 660 may cause the centerline functions to be executed. It being understood that the path 671 is not limited to a straight line, but could include a serpentine section to facilitate the crossing of multiple executable lines.

Similarly, path 670 originates in quadrant 663 and crosses the executable line 620 in an opposite (or different) direction than the path 671, to cause a different function F(4) to be executed. Path 672 originates in quadrant 662 and crosses the executable line 620 in a direction that causes the execution of function F(5). Path 673 originates in quadrant 664 and crosses the executable line 620 in an opposite (or different) direction than the path 672, to cause a different (or inverse) function F(6) to be executed.

FIG. 7 illustrates another executable line 700 according to another embodiment of the present invention. The executable line 700 is comprised of several segments, in this illustration four segments 710, 720, 730, 740 that are generally in function to the segments 610, 620 of FIG. 6. At least one segment, such as segment 710 is represented by a two-dimensional graphic, such as a rectangle, which enables the insertion of the directionality of the function, by, for example, an arrowhead, and the function itself.

As an illustration only, segment 710 illustrates a down arrowhead and an up arrowhead, which provide a visual representation of the directions of movement of the path formed by the user, as well as the respective addition and subtraction functions. Similarly, the segment 720 illustrates a down arrowhead and an up arrowhead, which provide a visual representation of the directions of movement of the path formed by the user, as well as the respective multiplication and division functions. As a result, the two segments 710, 720 provide the functionality of a basic calculator, with the added benefit of enabling the user to quickly enter the numbers and functions to be executed, by continuously swiping the digit across the touchscreen, without interrupting the swipe and without removing the digit from the touchscreen. As a result, the entries to the calculator are done at a faster pace, as it will be described later in greater detail.

Segments 730 and 740 may be added to complement the segments 710, 720, or, alternatively they can be functionally unrelated to the functions of the segments 710, 720. The directional arrowheads may or may not be included to facilitate the use of the user station. Segment 730 provides at least two inverse executable functions F(1) and inverse F(1), while segment 740 provides at least two unrelated functions F(2), F(3).

Returning now to FIG. 3 and to step 815 of FIG. 8A, user 1 continuously draws selection paths P1, P2 to select the desired contacts shown in the contact cell 325, to whom the various components of the correspondence will be selectively transmitted, as it will be explained in greater detail. Although FIG. 3 shows the selection paths P1, P2 as being drawn in the R cell of the gridded interface 310, it should be clear that these selection paths P1, P2 can alternative be drawn within the contacts cell 325. Upon completing the selection path P2, user 1 continues drawing path P3 into the M cell, in order to instruct the user station 100 that a message M1 is intended to be selectively sent to the contacts (e.g., users 2, 3) who have been designed by the selection paths P1, P2.

As illustrated in FIG. 3, path P1 instructs the user station 100 to send the message M1 to user 2. Similarly, path P2 instructs the user station 100 to send the message M1 to user 3. At step 825 of FIG. 8A, Path P3 instructs the user station 100 to send the message M1 which will either be selected in the M cell from a plurality of pre-recorded messages, emojis, etc., and/or will allow user 1 to input a new message (at least in part).

With further reference to step 820 of FIG. 8A, user 1 continuously draws selection paths P4, P5 in the Q cell of gridded interface 310, to select or designate the recipient contacts in the contacts cell 325 to whom the query or queries will be addressed (at step 825 of FIG. 8A). In this example, the query Q(x,y) to be sent to the selected contacts is pre-programmed and does not need to be selected or inputted by user 1.

Figure 12:
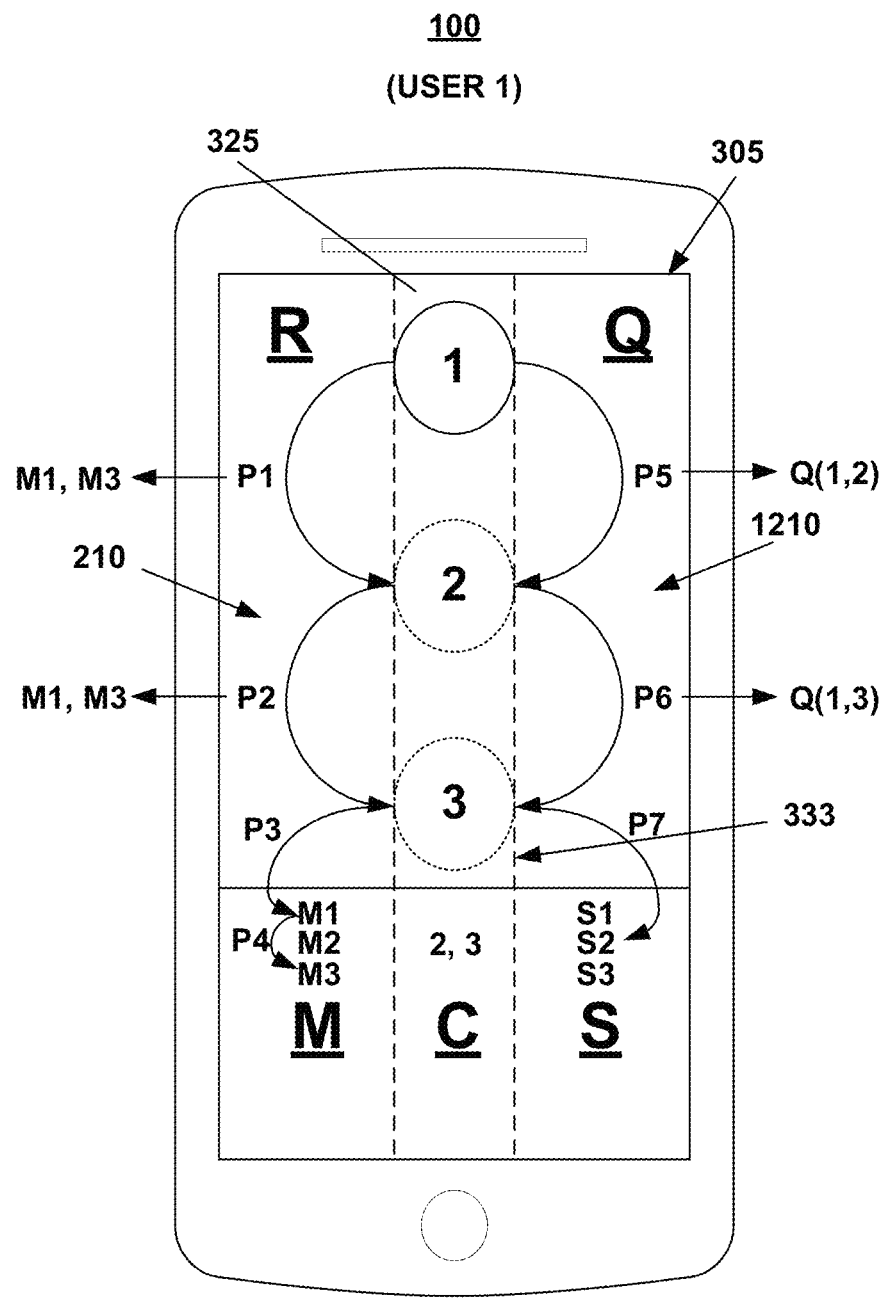

In more complicated applications, the query Q(x,y) or queries may need to be either selected from a list of pre-drafted (or pre-programmed) queries and/or inputted by user 1. FIG. 12 shows a user interface 1210 that is generally similar to the interface 310 (FIG. 3), with the added features that the bottom row of the gridded interface 1210 is now divided into more than just one cell M (as shown in FIG. 3). The bottom row may be divided into two or more cells. In this example, the bottom row is divided into three cells: M (Message) cell, C (Contacts) cell, and S (Query Listing) cell. The user may draw paths P3, P4 to select messages M1, M3 for transmittal to the following contacts: users 2 and 3 (shown in cell C). In addition, the user may also draw path P7 (or more than one path) to select one (or more) of pre-stored queries S2 (shown in cell S).

At step 830 of FIG. 8A, the user station 100 concurrently sends message M1 to both users 2 and 3, query Q(1,2) to user 2 and query Q(1,3) to user 3. Each of the transmitted, bundled message M1 and query Q(1,2) to user 2, and bundled message M1 and query Q(1,3) to user 3, are also referred to herein as "object" or "objects."

As described earlier, the path P3 to the M cell enables user 1 to either select a message from a plurality of pre-prepared messages (e.g., M1, M2, M3, etc.) or to input a new message. The C cell displays a visual representation of the contacts 2, 3 that have been selected to selectively receive the messages and queries. A new path P6 to an S cell enables user 1 to either select a query from a plurality of pre-prepared queries (e.g., Q1, Q2, Q3, etc.) or to input a new query Q(x, y).

In query Q (x,y), x designates the source user 1, and y designates the destination user or users (e.g., 2, 3). So, in the illustrations of FIGS. 3 and 9, selection path P4 generates a query Q(1,2) from user 1 to user 2, while selection path P5 generates a query Q(1,3) from user 1 to user 3. The query Q(x,y) is selected by means of paths P6 (FIG. 10). According to another embodiment, at least some of the various selection paths P1, P2, P$, P5, etc. can be pre-drawn so that the user does not drawn these paths, but rather has the ability to select at least some of them.

At the completion of step 830, process 800 proceeds to step 835 (FIG. 8B). With further reference to FIG. 10, it depicts a view of an exemplary user station (or computing device) 200 that includes a touchscreen 1005 which illustrates a gridded user interface 1010 that enables the user station 200 to communicate with other user stations (FIGS. 1 and 2), according to an exemplary embodiment of the present disclosure. The gridded user interface 1010 includes a grid 1033 that divides the touchscreen into four cells (also referred to herein as "fields"): a contacts cell 1025, an R cell, a Q cell, and an M cell. It should be understood that the grid 1033 is not limited to a tabular form that includes straight cell dividing lines; rather, the grid 1033 could alternatively be hand-drawn by the user to better suit the application for which it is designed.

In this exemplary embodiment, the contacts cell 1025 includes the contact addresses (e.g., email addresses, group addresses, or message addresses, etc.) of the user station 200, and the other user stations (or users) that the user station 200 wishes to communicate with. In this simplified example, contact 1 refers to the user station 100 or user 1, while contacts 2 and 3 refer to user stations (or users) 2 and 3 respectively (FIGS. 1 and 2). The R cell is also referred to as the response cell, and allows user 2 to select the contacts to whom he/she wishes to address a message; e.g., message M2.

The Q cell is also referred to as the query cell, and allows user 2 to select the contacts to whom he/she sends a query; e.g., Q(2,1), in order to elicit a response; e.g., response R(1,2). The M cell is also referred to as the message cell, and allows user 2 to select or draft a message; e.g., message M2, to the selected contacts.

With further reference to step 840 of FIG. 8B, user 2 draws a selection path P1 from user 2 to user 1, instructing the user station 200 to send message M2 to user 1. Upon reaching contact 1 (or user 1), user 2 draws a response path P2 around user 2, thus instructing the user station 2 to send a response R(2,1) to user 1. In this example, the response R(2,1) may be user 2's response to user 1's message M1, and as explained herein, this response can be captured by means of a camera or any other suitable means.

The response path P2 does not need to encircle contact 1, rather it can a sinuous path within the contacts cell 1025, in contact with, in the direction of, or in the vicinity of contact 1. According to another embodiment, a response cell 1026 may be created within the contacts cell 1025, as shown by the two parallel, dotted lines, so that the crossing of path P2, within the response cell 1026, in contact with, in the direction of, or in the vicinity of contact 1, will instruct the user station 2 to send a response R(2,1) to user 1.

At step 845, user 2 continues with response path P2 and draws a selection path P3 to (or toward) user 3, thereby selecting contact 3 as a recipient of message M2 which is initiated by user 2 (message M1 being initiated by user 1). User 2 does not encircle contact 3, thereby instructing the user station 200 not to send user's response (or feedback) to user 3. User 2 skips user 4, thus instructing the user station 200 not to send message M2 to user 4. User 2 then continues with selection path P3 and draws path P4 onto the M cell.

At step 850, user 2 proceeds with the drawing of selection paths P4, P5, so that the user station 200 transmits query Q(2,1) to user 1 and query Q(2,3) to user (or recipient) 3.

Assuming that user 2 inadvertently (or in error, or later changes his/her mind) draws selection path P6 to user 4, then user 2 can readily correct this mishap by drawing a reverse selection path P7, in the reverse direction of selection path P6, in order to offset or cancel the prior selection path P6. In a simplified manner, path P7 executes a delete or cancel function.

Upon completion of the selection steps 840, 845, 850, and user 2 selects or drafts message M2, user 2 can instruct the user station 2 to execute the corresponding instructions at step 855 so that user station 200 concurrently transmits the following objects:

Message M2 and query Q(2,3) to User 3.

Message M2, visual response R(2,1), and query Q(2,1) to user 1.

Figure 11:
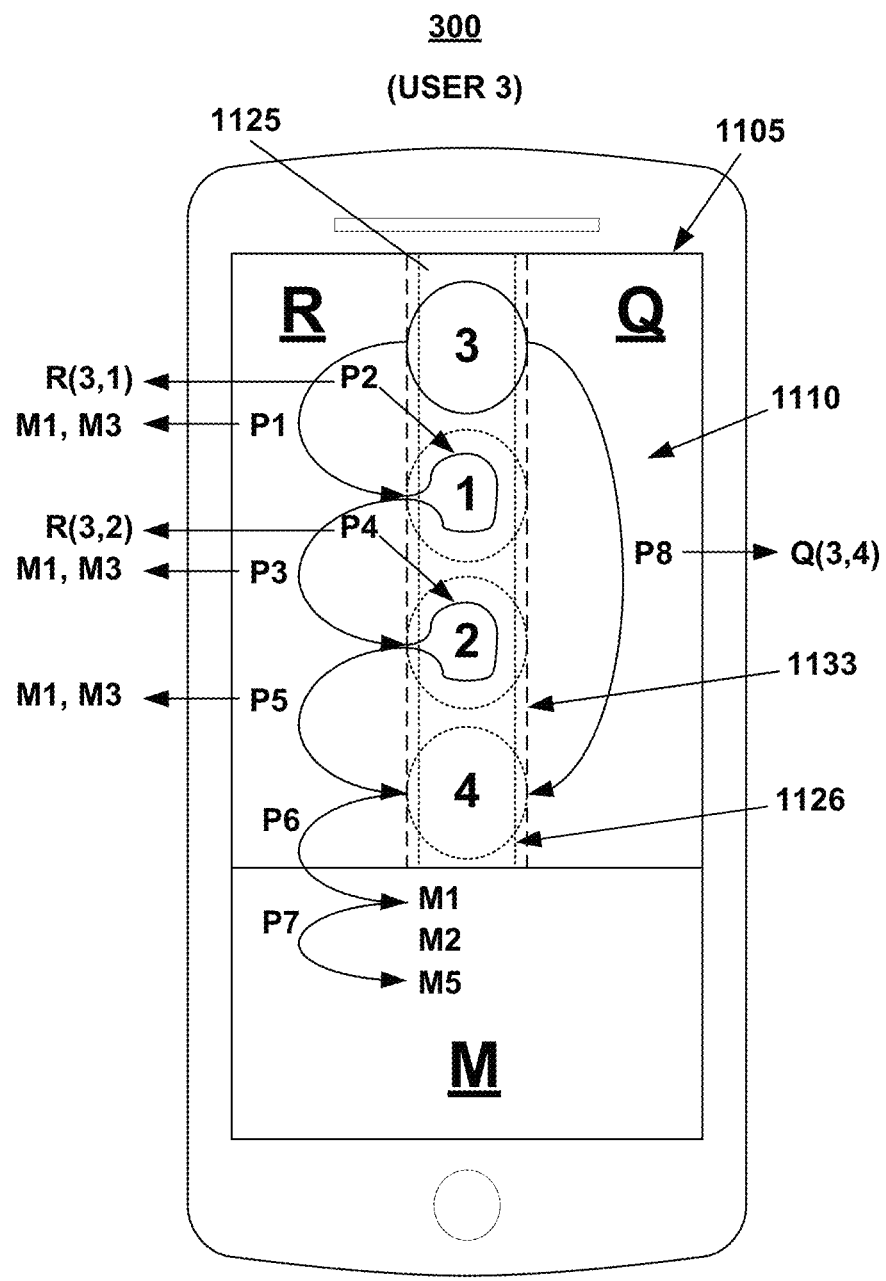

With further reference to FIG. 11, it depicts an exemplary user station (or computing device) 300 that includes a touchscreen 1105 which illustrates a gridded user interface 1110 that enables the user station 300 to communicate with other user stations (FIGS. 1 and 2), according to an exemplary embodiment of the present disclosure. The gridded user interface 1110 includes a grid 1133 that divides the touchscreen into four cells (also referred to herein as "fields"): a contacts cell 1125, an R cell, a Q cell, and an M cell. It should be understood that the grid 1133 is not limited to a tabular form that includes straight cell dividing lines; rather, the grid 1133 could alternatively be hand-drawn by the user to better suit the application for which it is designed.

In this exemplary embodiment, the contacts cell 1015 includes the contact addresses (e.g., email addresses, group addresses, or message addresses, etc.) of the user station 300, and the other user stations (or users) that the user station 300 wishes to communicate with. In this simplified example, contact 1 refers to the user station 100 or user 1, while contacts 2 and 3 refer to user stations (or users) 200 and 300 respectively (FIGS. 1 and 2). The R cell is also referred to as the response cell, and allows user 2 to select the contacts to whom he/she wishes to address a message; e.g., message M3 or a combination of messages M1, M3.

The Q cell is also referred to as the query cell, and allows user 3 to select the contacts to whom he/she sends a query; e.g., Q(3,4), in order to elicit a response; e.g., response R(4,3). The M cell is also referred to as the message cell, and allows user 3 to select or draft one or more messages; e.g., message M3 or a combination of messages M1, M3, to the selected contacts.

With further reference to step 860 of FIG. 8B, user 3 draws a selection path P1 from user 3 to user 1, instructing the user station 300 to send a combination of messages M1, M3 to user 1. Upon reaching contact 1 (or user 1), user 3 draws a response path P2 around user 1, thus instructing the user station 3 to send a response R(3,1) to user 1. In this example, the response R(3,1) may be user 3's response to user 1's message M1, and as explained herein, this response can be captured by means of a camera or any other suitable means.

As explained earlier, the response path P2 does not need to encircle contact 1, rather it can a sinuous path within the contacts cell 1125, in contact with, in the direction of, or in the vicinity of contact 1. According to another embodiment, a response cell 1126 may be created within the contacts cell 1125, as shown by the two parallel, dotted lines, so that the crossing of path P2, within the response cell 1126, in contact with, in the direction of, or in the vicinity of contact 1, will instruct the user station 3 to send a response R(3,1) to user 1. Similarly, user 2 draws paths P3, P4, P5.

At step 865, user 3 continues with response path P5 and draws selection paths P5, P6 to (or toward) users 2 and 4 respectively, thereby selecting contacts 2 and 4 as recipients of the combination messages M1, M3, wherein user-initiated message M1 (or another message) has been saved (or stored) on user station 300, and message M3 being initiated by user 3. User 3 then continues with the drawing of selection paths P6, P7 onto the M cell, to select messages M1 and M5.

At step 870, user 3 proceeds with the drawing of a single selection path P8, so that the user station 300 transmits query Q(3,4) to user 4, bypassing message recipients users 1, 4.

Upon completion of the selection steps 860, 865, 870, and user 3 selects message M1 and drafts message M3, user 3 can instruct the user station 3 to execute the corresponding instructions at step 875 so that user station 300 concurrently transmits the following objects:

Messages M1, M3 and Response R(3,1) to user 1.
Messages M1, M3 and Response R(3,2) to user 2.
Message M1, visual response R(3,1), and query Q(3,4) to user 4.

Figure 9:
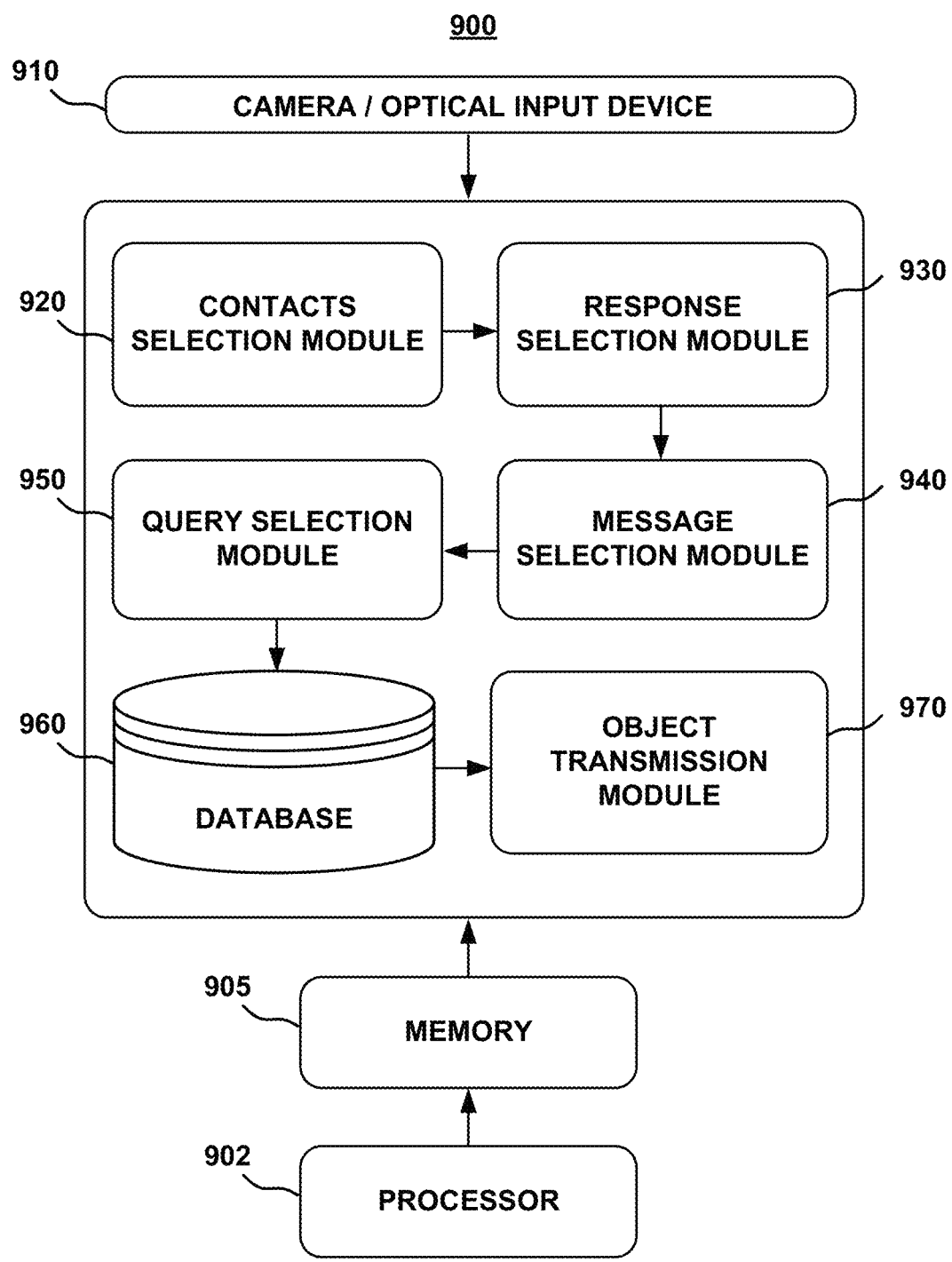
FIGS. 9, 10, 11, 12, 13, 14, 15, 16, 17, 18 depict additional exemplary user stations of FIG. 2, illustrating the gestural use of the gridded user interface according to various embodiments of the present disclosure.
Figure 10:
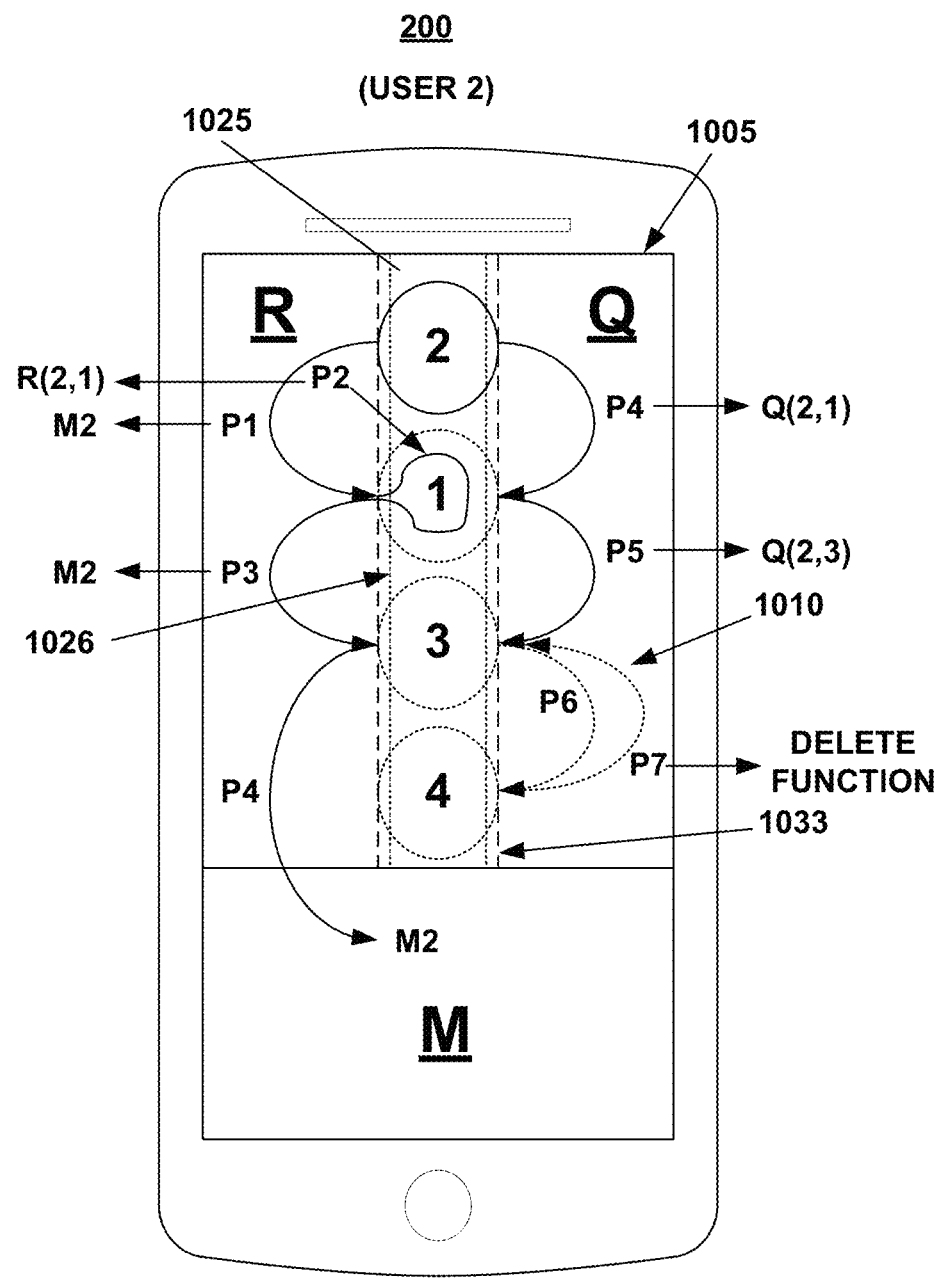

Turning now to FIG. 9, it represents a block diagram of an exemplary user station 900, such as user station 100 (FIG. 3), according to one embodiment of the present disclosure. User station 900 includes at least one camera or optical input device that selectively captures the user's response or reaction to a received object. The captured user's response or reaction can be saved on memory 905 or database 960. It should be understood that the object may be received on the user station 900 and/or on a different device or user station.

User station 900 further comprises a plurality of processing modules or logical instructions that can be executed by a computer or a processor 902. A "module" as understood herein can be implemented as hardware modules, or as software modules that encompass a software, instruction codes, hardware module, or a combination thereof, which provides the respective functionality, and which can be stored in memory 105 (or in another memory that may be accessible by the processor 902). Besides processor 902 and memory 905, the user station 100 can also include (or be connected to) user input and output devices such as a keyboard, mouse, stylus, and a display/touchscreen. As it will be explained in the following discussion, processor 902 can execute logical instructions stored on memory 905, perform object analysis and other quantitative operations, resulting in an output of results to the user station 900 or via a network.

More specifically, the user station 900 includes a contact selection module 920 that enables the implementation of step 815 (FIG. 8A) as well as steps 840, 860 (FIG. 8B), as explained earlier. A response selection module 930 enables the implementation of step 815 (FIG. 8A) as well as steps 845, 865 (FIG. 8B). A message selection module 940 enables the implementation of step 815 (FIG. 8A) as well as steps 840, 860 (FIG. 8B).

A query selection module 950 enables the implementation of step 820 (FIG. 8A) as well as steps 850, 870 (FIG. 8B). The outputs of the contacts selection module 920, the response selection module 930, the message selection module, and the query selection module 950 are stored and tabulated, as needed, in a storage or database 960, and the stored or tabulated outputs are collectively referred to as object. An object transmission module 970 selectively transmits and distributes the various components of the objects to the intended destinations.

Figure 13:
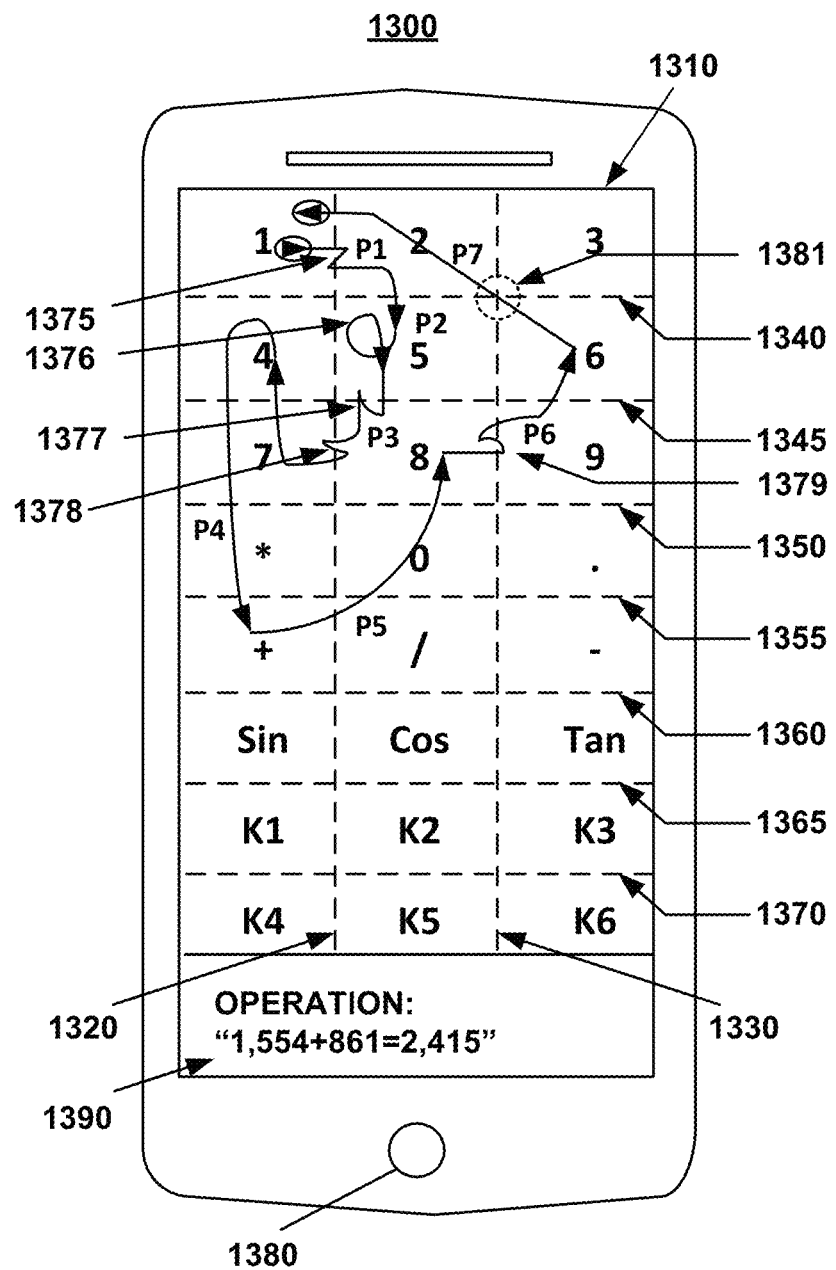

Referring now to FIG. 13, it illustrates a user station 1300 that can be used, for example, as a calculator. In this illustration, the user station displays an executable (and/or programmable) gridded interface 1310. The interface 1310 may be comprised of two sets of executable lines (or outlines) that form a plurality of tabulated cells (or keys). In this example, the interface 1310 includes a set of executable vertical lines 1320, 1330, and another set of executable horizontal lines 1340, 1345, 1350, 1355, 1360, 1365, 1370, that intersect to form numeric cells (1 through 0), function cells ("*" or multiplication, "+" or addition, "/" or division, "." or decimal, "Sin" or sine, "Cos" or cosine, and "Tan" or tangent). The interface 1310 may also include a plurality of programmable or selectable functions cells (e.g., K1-K6). In addition, the interface 1310 may include an operation cell that shows the arithmetic operation (or function or equation) being executed as well as the result.

In this example, the user starts by selecting the calculator function on the user station 1300. The user then starts drawing an uninterrupted (or partially uninterrupted) execution path that executes one or more functions or equations. The user starts the uninterrupted execution path at cell 1 to select "1" as the first digit, then draws path executable P1 that crosses executable line 1320, through cell 2, and into cell 5. Path P1 includes a sinuous section 1375, which is executed upon crossing, to instruct the user interface 1310 to ignore the next cell 2 (or more than one subsequent cell). In other terms, the user interface 1310 ignores the content of cell 2. The crossing of the executable line 1340 instructs the user interface 130 to select the next cell, i.e., cell 5 and accept its value, e.g., 5. As a result, the digits that are selected so far are "1" and "5."

The user then continues with drawing executable path P2 starting with cell 5. Although it would preferable for the user to avoid lifting the stylus to draw path P2, so that paths P1 and P2 form a continuous, uninterrupted line, it is possible for the user to lift the stylus once path P1 is completed, and then restart by drawing path P2.

Path P2 contains a repetition loop 1376 that instructs the user interface 1310 to re-select the content of cell 5. In this example, the repetition loop 1376 repeats the selection of the number "5" so that the selected digits so far are "1," "5," and "5." While the repetition loop 1376 is shown as an actual loop, it should be understood that the user interface 1310 may be programmed to interpret another graphical designation of the user's choice as a repetition loop, and thus the user interface 1310 is not limited to a specific loop.

The user then continues by drawing executable path P3, starting with cell 5, crossing the horizontal executable line 1345 with a sinuous section 1377 to ignore the content of cell 8, and then crossing the vertical executable line 1320 with another sinuous (or serpentine) section 1378 to ignore the content of cell 7, and then crosses the horizontal executable line 1345 to select the content of cell 4, namely the number "4". As a result, the selected digits so far are "1," "5," "5," and "4," generating the first number 1,554 to which the operation will be applied. Alternatively, the user may have drawn path P3 as going directly from cell 5, crossing the vertical executable line 1320, which would have rendered the same result.

Once cell 4 is reached, the user wishes to apply the addition operation to the selected number 1,554. To do so, the user can use a finger of the hand not holding the stylus, to press an omit function that is programmed on a start button 1380, in order to ignore all the executable functions until the desired operation is reached. It should also be understood that instead of selecting a physical button 1380, the use may select a functional key on the user interface 1310 in order to effect the same result. As an example, cell 6 may be program to execute the omit function.

In this example, the user wishes to ignore or omit the functions of all the cells it crosses until it reaches the addition (+) operation. So, the user draws an executable path P4 that terminates in the "+" cell. The user interface 1310 then executes the content of the addition cell.

The user then presses the omit function as explained earlier, and concurrently (or later) draws executable path P5 that ends in cell 8, instructing the user interface 1310 to accept (or select) the content of cell 8.

The user then continues drawing executable line P6, ignoring the content of cell, but selecting the content of cell 6. According to another embodiment, the user may select the omit function instead of drawing a sinuous section 1379, in order to omit the selection of the content of cell 9.

The user then continues by drawing executable path P7 through an intersection 1381 of executable horizontal line 1340 and vertical line 1330 (encircled within a dotted circle for ease of identification only), to end in cell 1, wherein the user lifts the stylus off the user interface 1310 to execute the operation as shown in the operation cell 1390.

Figure 14:
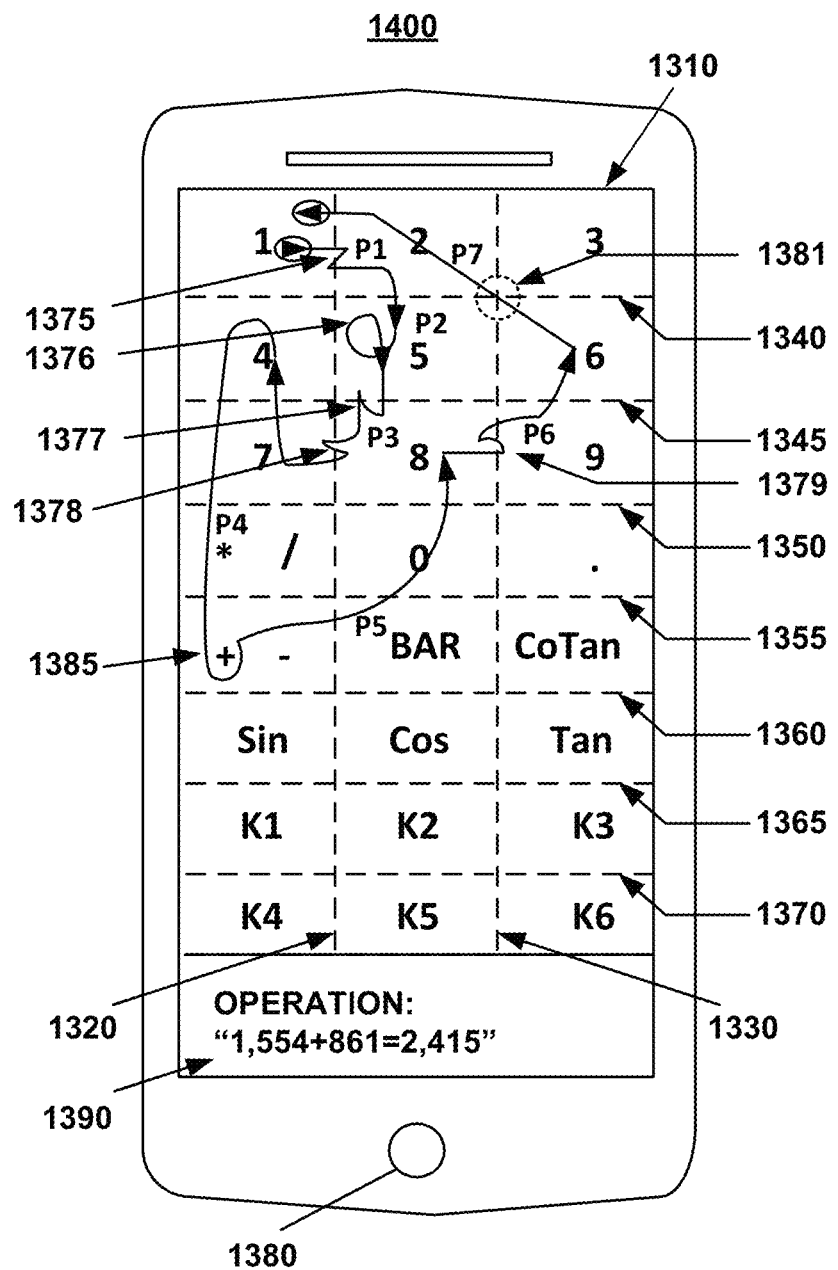

FIG. 14 illustrates another user interface 1400 that is substantially similar to the user interface 1300. The user interface 1400 illustrates the fact that one cell can contain more than one selectable and executable function. In this example, the "+−" cell shows two functions: addition and subtraction, from which the user can select. It should be understood that that more than two functions can be included in the cell, and the user has the ability to concurrently select more than just one function (or equation). In this example, the user decides to select the addition function, and so the user draws a loop (closed or open as shown) 1385 to instruct the user interface 1310 to execute the selected function (or alternatively to successively execute more two or more functions that are selected, in succession, using loops that are similar to loop 1385).

Figure 15:
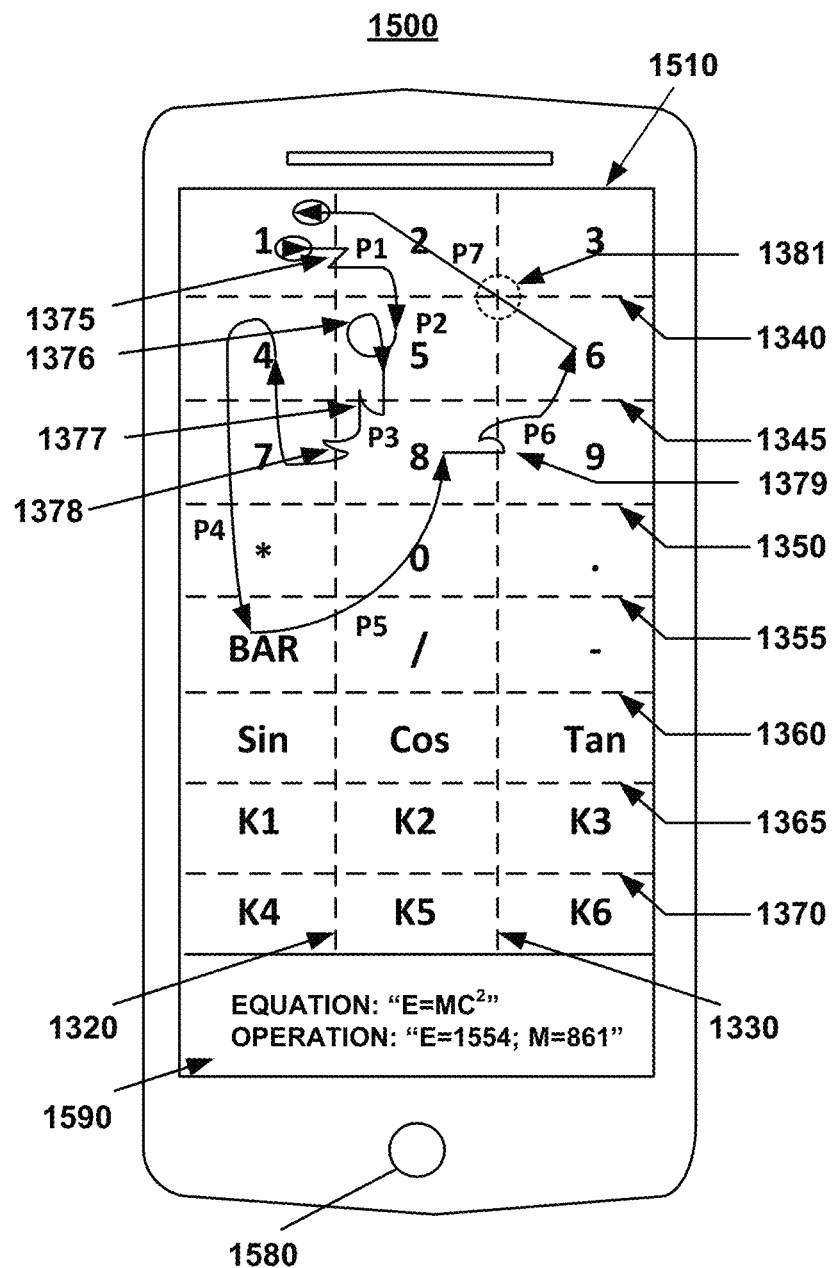

FIG. 15 illustrates another user interface 1500 that is substantially similar to the user interfaces 1300, 1400. The user interface 1500 illustrates the execution of an equation, e.g., $E=MC^2$. To do so, the user first selects the desired equation to be executed. For example, the equation could be preprogrammed in cell K1, and the user may simply press on cell K1 so that the equation to be executed appears in an execution display 1590. Thereafter, the first number to drawn by the user may be assigned to the first variable, E, in the equation, and the second number may be assigned to the second variable, C, it being understood that "M" represents a constant whose value is stored in memory 905 (FIG. 9). The units for each variable may also be stored in memory 905. In order to separate between the first and second numbers, a BAR cell is accessed between paths P4 and P5.

An execution button 1580 may be pressed by the user to start the execution of the operation and to generate an output. Alternatively, the processor 902 (FIG. 9) automatically executes the equation as soon as the numbers are entered by the users, without having to press the execution key 1580.

Figure 16:
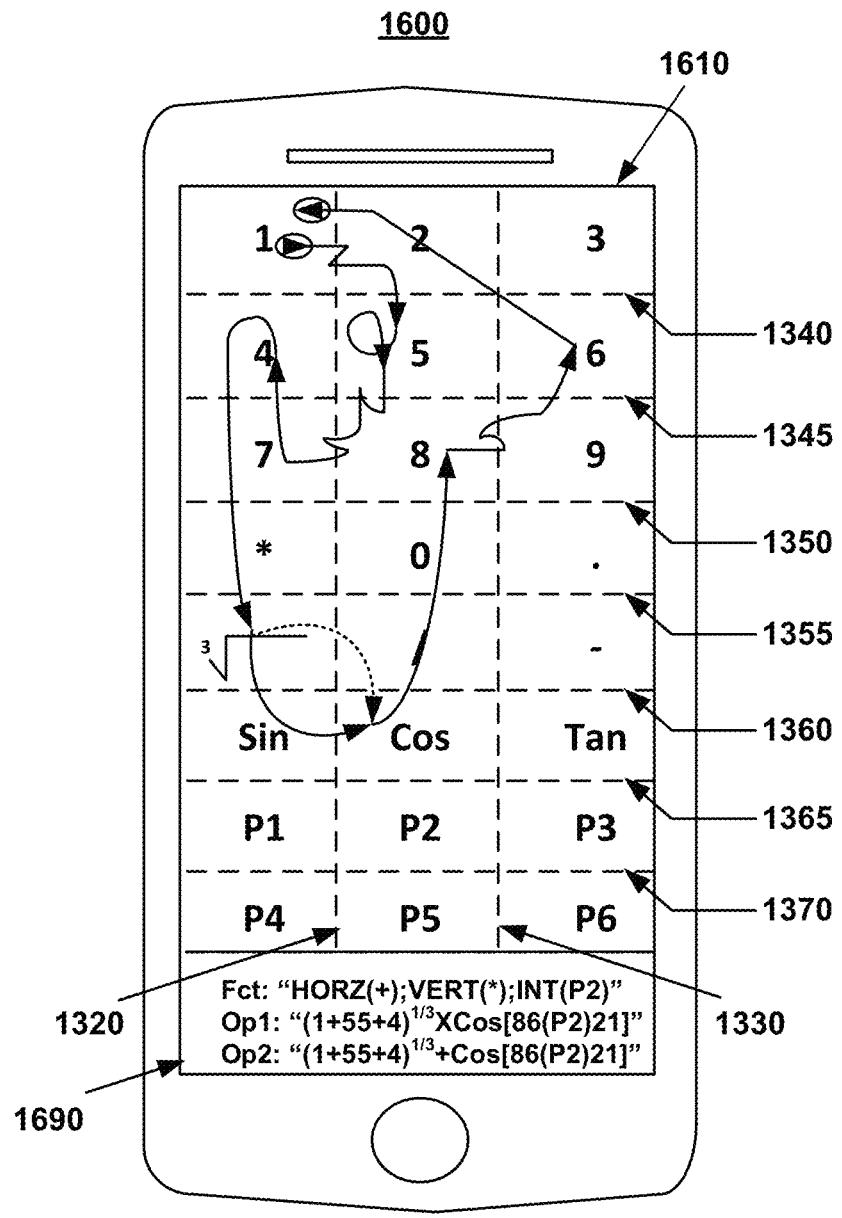

FIG. 16 illustrates another user station 1600 using an interface 1610, in a generally similar manner as the user interfaces 1400, 1500, with the added feature that the vertical and horizontal grid lines 1320 through 1370 are executable and thus, when the user draws a path that crosses any of these lines, a corresponding function is executed. In this example, an execution display 1690 illustrates the fact that the horizontal grid line executes an addition function, which the vertical grid line executes a multiplication function.

Figure 17:
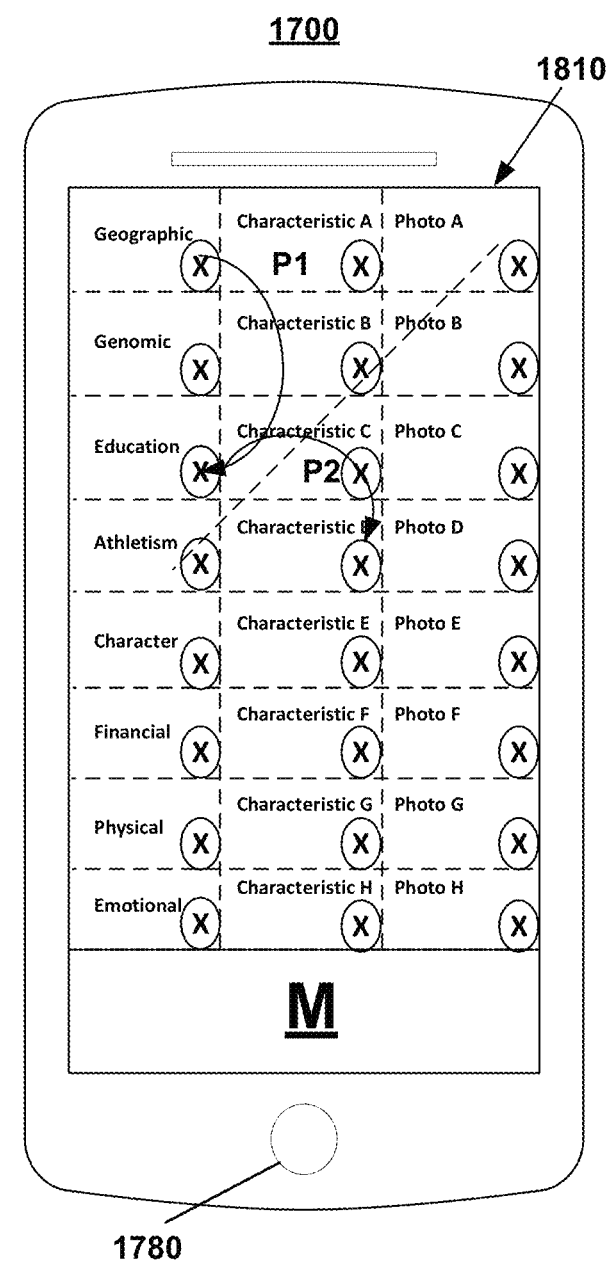

It should be noted that the user interfaces described herein are not limited to numbers and functions but may be used in various applications. FIG. 17 illustrates one such application wherein a user station 1700 includes a user interface 1710 that enables social matching of people. In this example, the user starts by selecting the Geographic cell by pressing the "X" in this cell, then draws path P1 to select the Education cell by pressing the "X" in this cell, and then draws path P2 to select a pre-programmed personal characteristic (such as desired blood type (or not a blood type), genotype, phenotype, homozygous recessive gene (aa), homozygous dominant gene (AA), heterozygote gene (Aa), etc.). In more sophisticated medical or biotechnological related applications, the available choices may include various alleles, molecules, nuclei, etc.

Figure 18:
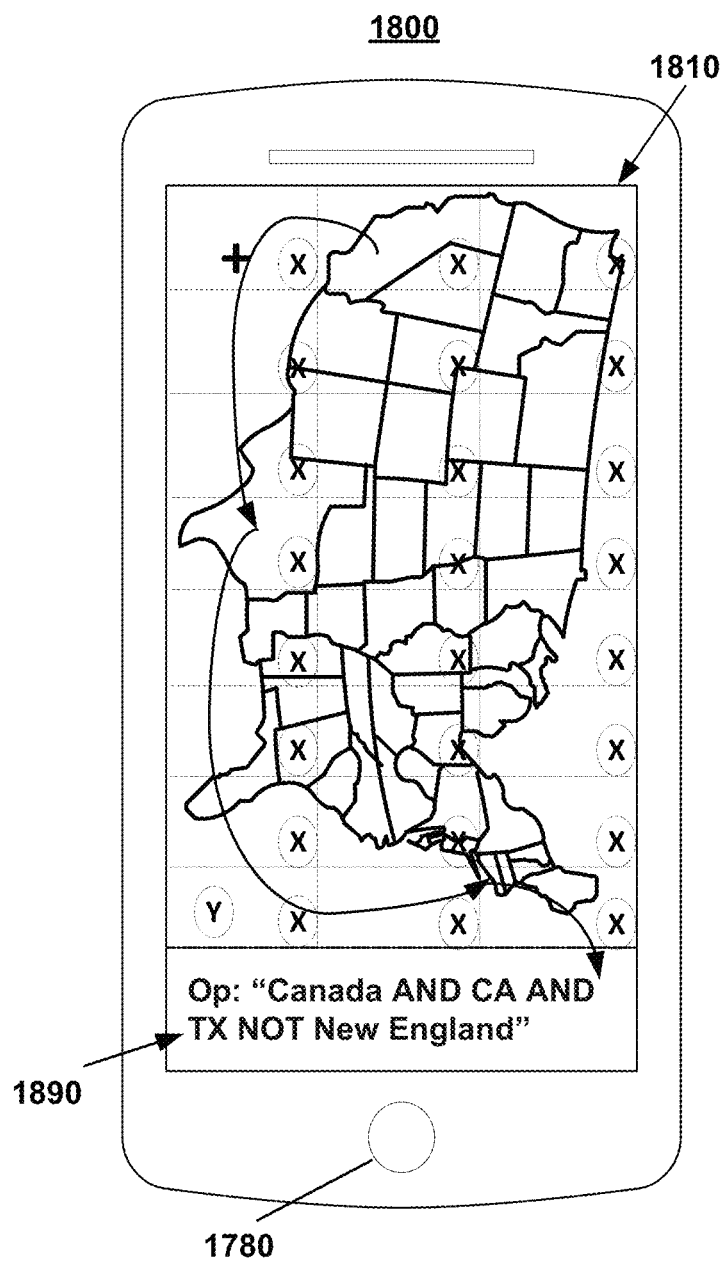

With each selection of the "X" in the cell, such as the Geographic cell, the user interface 1710, open a new user interface 1810 (FIG. 18) to enable the user to make additional selections (or filters) in this new user interface 1810, and when done, the user is returned automatically to the original user interface (or dashboard) 1700. The user interface 1810 allows the user to select the countries of interest using operations as described earlier to make specific selections, with the operation and the result being displayed in the display cell 1780. Once the selection is completed, the user may either press a selection (or return) key 1780 (using his/her finger) to return to the dashboard user interface 1710, or alternatively the user may select to draw a path to an exit cell that is labeled "Y" within a dotted circle.

Figure 19:
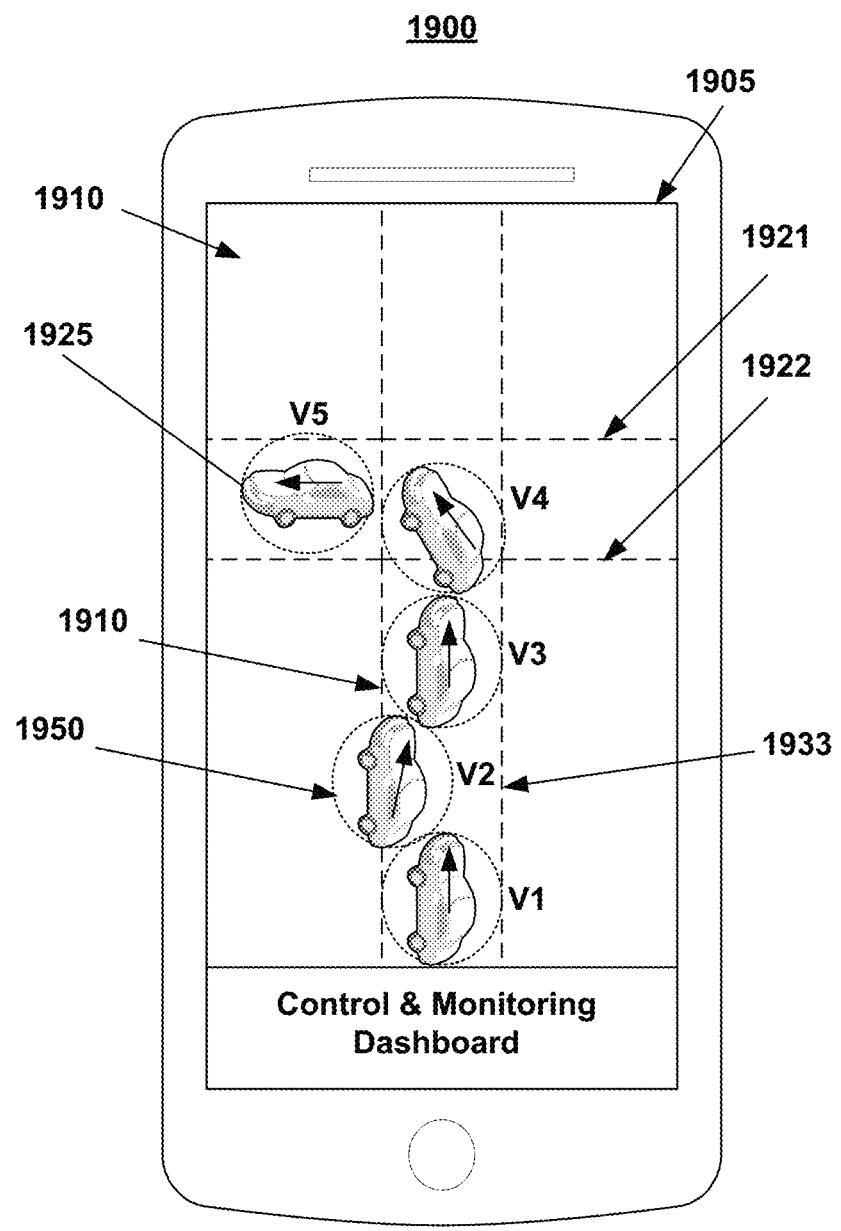
FIG. 19 illustrates a vehicle GPS or travel monitoring and control application on a gaming station, according to one aspect of the present disclosure.

The present invention may have applications beyond a portable communications user station. As an example, FIG. 19 illustrates a vehicle GPS or travel monitoring and control application on a gaming station 1900, according to one aspect of the present invention. The gaming station includes a touchscreen 1905 which illustrates a gridded user interface 1910 that enables the gaming station 1900 to control the movements or characteristics of characters or items (in this example a vehicle 1919). In this example, the vehicle 1919 is racing on a path delineated by the executable grid between the executable vertical lines 1910, 1933, and the executable horizontal lines 1921, 1922.

Another application that may be similarly be associated with the station 1900 is the actual control of a vehicle (such as a driverless vehicle or for recording traffic violations). In this application, each of the executable lines of the executable grid may be programmed to execute a function or equation, as the executable line is crossed by the vehicle 1925. More specifically, position V1 of the vehicle 1925 shows that the vehicle is proceeding within the designated path, within the acceptable speed limit, and in the correct direction (as illustrated by the arrow) and as a result, no corrective action is desired.

At position V2, the vehicle 1925 has crossed the vertical executable line 1910, causing the execution of the function or algorithm associated with line 1910. The execution could be automatic or, in an alternative embodiment, in the form of a recommendation to the user to take the appropriate action. In this illustration, the angle of the arrow atop the vehicle 1925 with vertical line 1910 changes (sometimes visibly to the user) to aid (for example, the driver) in correction the driving path of the vehicle 1925.

In operation, the executable grid is overlaid onto the map of travel, so that each of the executable lines is defined and shown overlaying the map of travel. As the vehicle crosses an executable line, the associated function is automatically executed by the vehicle 1925.

In another embodiment, each vehicle is shown to be surrounded by a virtual, executable bubble 1950 (illustrated in dotted line), whose coverage is larger than that of the vehicle 1925, so that the bubble 1950 pre-crosses any one of the executable lines, prior to the actual vehicle 1925 crossing that executable line. As a result of such pre-crossing of the executable line by the bubble 1950 provides an advance warning or pre-execution of a function, equation, or algorithm, to minimize the effect of the upcoming crossing, or to take corrective action.

It should be understood that while the present illustration is described in term of a continuous swipe, other strokes or swipes can be used, including discontinuous swipes. Furthermore, the swipe could possess additional dimensions, such as the speed and pressure at which the swipe (or stroke) are drawn. The variability of these dimensions could also affect, for example the selection and execution of the various modules in the user station.

In an alternative embodiment where the picture or video reaction is insufficient, a reaction analysis module (which could be an integral part or external part to the user station) analyzes the reactions and provides an additional review (or dimension) to the recipient's reaction, whether as a written message, or as a control signal that executes a specific application on the user station. As the user station learns from the reactions (such as by artificial intelligence), the user station can be a predictor or the recipient user's reactions, and can execute the appropriate instructions or applications.

The present application may also be used in database searching, organizing, and categorizing. The input to the user station may then be any kind of input, related to genomics, genes, sound, frequencies, colors, wavelengths, letters, numbers, etc. If the user wishes to narrow down a result of a database search with specific features (e.g., homozygous recessive genes) the user can add a search term by selectively using a swipe (or another motion) as described herein.

In each of the figures described herein, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, the use of a specific sequence of steps is not meant to imply any limitations on the invention. Changes may be made with regards to the sequence of steps without departing from the spirit or scope of the present invention. The use of a particular sequence is therefore, not to be taken in a limiting sense, and the scope of the present invention is defined only by the appended claims.

As it will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As it will be further appreciated, the processes in embodiments of the present invention may be implemented using any combination of software, firmware or hardware. As a preparatory step to practicing the invention in software, the programming code (whether software or firmware) will typically be stored in one or more computer readable storage mediums for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F., etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while illustrative embodiments of the present invention are described in the context of a fully functional computer (server) system with installed (or executed) software, those skilled in the art will appreciate that the software aspects of the illustrative embodiments of the present invention are capable of being distributed as a program product in a variety of forms, and that an illustrative embodiment of the present invention applies equally regardless of the particular type of media used to actually carry out the distribution.

In addition, while the present invention has been described with reference to exemplary embodiments, it will be understood by those skilled in the art that various changes may be made and equivalents may be substituted for elements thereof without departing from the scope of the invention. Furthermore, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another. In addition, listing terms such as "a", "b", c", "first", "second", and "third" are used herein and in the appended claims for purposes of description and are not intended to indicate or imply relative importance or significance.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While particular embodiments of the present invention have been disclosed, it is to be understood that various different modifications are possible and are contemplated within the scope of the specification, drawings, abstract and appended claims.

What is claimed is:

1. A user interface for use with an initiating user station to communicate or network with at least one recipient user station, the user interface comprising:
    a touchscreen;
    wherein the touchscreen includes an executable grid that defines at least one contacts selection module and at least one message selection module, M;
    wherein the executable grid is defined by at least one executable outline, which, when crossed by a swiping motion, executes a predetermined function;
    wherein the predetermined function includes selecting and adding the content of selected fields;
    wherein the contacts selection module enables a user to select one or more recipient contacts to whom a message will be addressed, by swiping a continuous contacts selection path on the touchscreen, successively between selected recipient contacts fields;
    wherein the contacts selection path crosses the executable outline in at least one location in order to execute the predetermined function, causing the recipient contacts to be cumulatively selected;
    wherein the message selection module, M, enables any one of the entry of the message addressed to the cumulatively selected recipient contacts, or the selection of the message addressed to the cumulatively selected recipient contacts by any one of the entry or by swiping a continuous message selection path on the touchscreen;
    wherein the message selection path crosses the executable outline in at least one location in order to execute the predetermined function, causing the cumulatively selected recipient contacts to be associated with the message; and
    a transmitter for transmitting the message to the associated recipient contacts.

2. The user interface of claim 1, wherein the executable grid further defines a response selection module, R, that enables the user to optionally identify one or more queried recipient contacts to whom the message and a query will be addressed, by swiping a continuous response selection path on the touchscreen;

wherein said at least one or more queried recipient contacts form a subset of the selected recipient contacts; and wherein the response selection path crosses the executable outline in at least one location in order to execute the predetermined function, causing said at least one or more queried recipient contacts to be cumulatively selected.

3. The user interface of claim 2, wherein the executable grid further defines a query selection module, Q, that enables any one of the entry or selection of the query addressed to the selected queried recipient contacts, or the selection of the query addressed to the selected queried recipient contacts by swiping a continuous query selection path on the touchscreen;

wherein the query selection path crosses the executable outline in at least one location in order to execute the predetermined function, causing the queried recipient contacts to be cumulatively selected.

4. The user interface of claim 3, wherein a queried recipient contact uses the recipient user station; and wherein the recipient user station includes a touchscreen which defines a response selection module that receives a bundled object from the initiating user station and that selectively or automatically provides feedback to the query within the received bundled object, to any one or more of the initiating user station or to another recipient user station.

5. The user interface of claim 4, wherein the recipient user station response selection module provides feedback to the query by performing any one or more functions of:

selectively authorizing the acquisition of the queried recipient contact's reaction to the message within the bundled object; or automatically authorizing the acquisition of the queried recipient contact's reaction to the message within the bundled object.

6. The user interface of claim 5, wherein the recipient contact's reaction is captured as a reaction message comprised of any one or more of: a voice reaction message, a video reaction message, or a photo reaction message; and wherein the reaction message includes the queried recipient contact's verbal or non-verbal cues.

7. The user interface of claim 3, wherein at least of the contacts selection path, message selection path, response selection path, or query selection path are pre-drawn, so that a selection of a pre-drawn path executes an associated function.

8. The user interface of claim 4, wherein the queried recipient contact is the initiating user station, to enable the user to receive verbal or non-verbal cues as feedback.

9. The user interface of claim 4, wherein at least one of the selected recipient contacts uses a selected recipient user station having a touchscreen;

wherein selected recipient user station includes a query selection module, Q, which upon receipt of an associated bundled object from the initiating station of enables any one of the entry or selection of another query addressed to another set of selected queried recipient contacts, or the selection of said another query addressed to said another set of selected queried recipient contacts, by swiping a continuous query selection path on the selected recipient user station touchscreen.

10. The user interface of claim 1, wherein the executable outline comprises a plurality of executable sections;

wherein the plurality of executable sections are adapted to execute a plurality of distinct, pre-selected functions; and wherein the pre-selected functions are executed upon being crossed by the swiping motion.

11. The user interface of claim 10, wherein the executable grid is adapted to be modularly defined.

12. The user interface of claim 11, wherein the size of the executable grid is modularly expanded by swiping a directional line with a predetermined origin, wherein the directional line crosses a preselected executable section of the executable outline.

13. A method of using an initiating user station having a touchscreen for communicating or networking with at least one recipient user station, the method comprising:

defining an executable grid on the touchscreen that outlines at least one contacts selection module and at least one message selection module, M;

wherein crossing the executable grid by a swiping motion, executes a predetermined function;

the contacts selection module enabling a user to select one or more recipient contacts to whom a message will be addressed, by swiping a continuous contacts selection path on the touchscreen, successively between selected recipient contacts fields;

the contacts selection path executing the predetermined function, causing the recipient contacts to be cumulatively selected, by crossing the executable grid in at least one location;

the message selection module, M, enabling any one of the entry of the message addressed to the cumulatively selected recipient contacts, or the selection of the message addressed to the cumulatively selected recipient contacts by any one of the entry or by swiping a continuous message selection path on the touchscreen;

the message selection path causing the cumulatively selected recipient contacts to be associated with the message by crossing the executable grid in at least one location in order to execute the predetermined function;

a database selectively tabulating the message and the associated recipient contacts, as bundled objects; and a transmitter selectively transmitting the bundled objects to the associated recipient contacts.

14. The method of claim 13, further including:

said at least one recipient user station receiving at least one of said bundled objects;

in response to said at least one of said bundled objects, said at least one recipient user station capturing a recipient user's reaction to said at least one of said bundled objects; and forwarding the recipient user's reaction to the initiating user station.

15. The method of claim 13, wherein the executable function is caused to be executed by means of a swiping motion along one direction; and wherein an inverse swiping motion along an opposite direction causes an inverse of the executable function to be executed.

16. The method of claim 13, wherein executing a first function includes an entry of alphanumeric words or symbols.

17. The method of claim 13, wherein the executable grid defines a response selection module, R, that enables the user to optionally identify one or more queried recipient contacts to whom the message and a query will be addressed, by swiping a continuous response selection path on the touchscreen; and selectively transmitting the bundled objects to the associated recipient contacts, includes transmitting different combinations of messages and queries to different recipient user stations.

18. A non-transitory computer-readable storage medium storing one or more programs, the one or more programs comprising instructions which, when executed by a touchscreen that forms part of a user station, cause the user station to perform operations comprising:
 the user station includes an executable grid that is defined on a touchscreen;
 wherein the executable grid outlines a plurality of executable cells;
 wherein each executable cell is defined by executable lines;
 a single uninterrupted swiping path across the plurality of executable cells and executable lines, causes a plurality of numbers and cross-cell functions to be selected;
 wherein the swiping path includes at least one graphical sub-path within one of the plurality of executable cells, causing an intra-cellular function to be selected; and
 wherein the interruption of the swiping path causes the cross-cell functions and the intra-cellular functions to be executed relative to the selected numbers, sequentially and progressively along the swiping path.

19. The non-transitory computer-readable storage medium of claim 18, wherein the intra-cellular functions include any one or more of:
 duplication of the entry of an alphanumeric character, digit, or symbol; or
 instantaneous execution of a predefined function, out of order, prior to the interruption of the swiping path.

* * * * *